(12) United States Patent
Dwarampudi et al.

(10) Patent No.: US 10,127,070 B2
(45) Date of Patent: Nov. 13, 2018

(54) EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM

(71) Applicant: Commvault Systems, Inc., Tinton Falls, NJ (US)

(72) Inventors: Bheemesh R. Dwarampudi, Jackson, NJ (US); Rajiv Kottomtharayil, Marlboro, NJ (US); Rahul S. Pawar, Marlboro, NJ (US); Parag Gokhale, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 15/383,956

(22) Filed: Dec. 19, 2016

(65) Prior Publication Data

US 2017/0102960 A1    Apr. 13, 2017

Related U.S. Application Data

(60) Continuation of application No. 14/816,815, filed on Aug. 3, 2015, now Pat. No. 9,588,972, which is a
(Continued)

(51) Int. Cl.
*G06F 17/00*     (2006.01)
*G06F 9/455*     (2018.01)
(Continued)

(52) U.S. Cl.
CPC .......... *G06F 9/45558* (2013.01); *G06F 3/065* (2013.01); *G06F 3/067* (2013.01);
(Continued)

(58) Field of Classification Search
CPC ....... G06F 2009/4557; G06F 17/30233; G06F 17/30073
(Continued)

(56) References Cited

U.S. PATENT DOCUMENTS 4,686,620 A    8/1987   Ng
4,995,035 A    2/1991   Cole et al.
(Continued)

FOREIGN PATENT DOCUMENTS

EP    0259912 A1    3/1988
EP    0405926 A2    1/1991
(Continued)

OTHER PUBLICATIONS

"Global Repository Cell (GRC)—Advanced" [online], Accessed on Apr. 16, 2014, Retrieved from the Internet: URL: http://documentation.commvault.com/commvault/v10/article?p=features/robo/grc_advanced.htm, 4 pages.
(Continued)

*Primary Examiner* — Pavan Mamillapalli
(74) *Attorney, Agent, or Firm* — Perkins Coie LLP

(57) ABSTRACT

Software, firmware, and systems are described herein that permit an organization to dock previously-utilized, limited-feature data management modules with a full-featured data management system. By docking limited-feature data management modules to a full-featured data management system, metadata and data from the various limited-feature data management modules can be integrated and utilized more efficiently and effectively. Moreover, additional data management features can be provided to users after a more seamless transition.

20 Claims, 12 Drawing Sheets

Related U.S. Application Data continuation of application No. 13/926,332, filed on Jun. 25, 2013, now Pat. No. 9,098,514, which is a division of application No. 13/250,962, filed on Sep. 30, 2011, now Pat. No. 8,620,870.

(60) Provisional application No. 61/388,574, filed on Sep. 30, 2010.

(51) Int. Cl.

| | | |
|---|---|---|
| *G06F 17/30* | (2006.01) | |
| *G06F 11/14* | (2006.01) | |
| *G06F 9/445* | (2018.01) | |
| *G06F 3/06* | (2006.01) | |
| *G06F 9/4401* | (2018.01) | |
| *H04L 29/06* | (2006.01) | |

(52) U.S. Cl.
CPC .......... *G06F 3/0619* (2013.01); *G06F 3/0665* (2013.01); *G06F 9/442* (2013.01); *G06F 9/445* (2013.01); *G06F 11/1448* (2013.01); *G06F 11/1464* (2013.01); *G06F 17/30073* (2013.01); *G06F 17/30233* (2013.01); *G06F 17/30342* (2013.01); *G06F 17/30864* (2013.01); *G06F 17/30876* (2013.01); *G06F 17/30991* (2013.01); *H04L 63/083* (2013.01); *G06F 9/455* (2013.01); *G06F 2009/45583* (2013.01); *G06F 2201/815* (2013.01)

(58) Field of Classification Search
USPC .................................................. 707/667, 665
See application file for complete search history.

(56) References Cited

U.S. PATENT DOCUMENTS

| | | | |
|---|---|---|---|
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,448,724 | A | 9/1995 | Hayashi |
| 5,491,810 | A | 2/1996 | Allen |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,559,957 | A | 9/1996 | Balk |
| 5,619,644 | A | 4/1997 | Crockett et al. |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,901,327 | A | 5/1999 | Ofek |
| 5,924,102 | A | 7/1999 | Perks |
| 5,950,205 | A | 9/1999 | Aviani, Jr. |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem |
| 6,094,416 | A | 7/2000 | Ying |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,389,432 | B1 | 5/2002 | Pothapragada et al. |
| 6,421,711 | B1 | 7/2002 | Blumenau et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,564,228 | B1 | 5/2003 | O'Connor |
| 6,581,076 | B1 | 6/2003 | Ching et al. |
| 6,658,526 | B2 | 12/2003 | Nguyen et al. |
| 6,772,159 | B1 | 8/2004 | Blount et al. |
| 6,850,953 | B1 * | 2/2005 | Deshpande ....... G06F 17/30607 707/999.101 |
| 7,035,880 | B1 | 4/2006 | Crescenti et al. |
| 7,076,270 | B2 | 7/2006 | Jaggers et al. |
| 7,219,162 | B2 | 5/2007 | Donker et al. |
| 7,246,207 | B2 | 7/2007 | Kottomtharayil et al. |
| 7,356,817 | B1 | 4/2008 | Cota-Robles et al. |
| 7,383,463 | B2 | 6/2008 | Hayden et al. |
| 7,395,282 | B1 | 7/2008 | Crescenti et al. |
| 7,420,546 | B2 * | 9/2008 | Abdallah ................ G06F 21/32 345/173 |
| 7,448,079 | B2 | 11/2008 | Tremain |
| 7,561,899 | B2 | 7/2009 | Lee |
| 7,631,351 | B2 | 12/2009 | Erofeev |
| 7,730,035 | B2 | 6/2010 | Berger et al. |
| 7,739,527 | B2 | 6/2010 | Rothman et al. |
| 7,756,835 | B2 | 7/2010 | Pugh |
| 7,756,964 | B2 | 7/2010 | Madison, Jr. et al. |
| 7,788,665 | B2 | 8/2010 | Oshins |
| 7,802,056 | B2 | 9/2010 | Demsey et al. |
| 7,840,537 | B2 | 11/2010 | Gokhale et al. |
| 7,882,077 | B2 | 2/2011 | Gokhale et al. |
| 7,899,788 | B2 | 3/2011 | Chandhok et al. |
| 7,937,421 | B2 | 5/2011 | Mikesell et al. |
| 8,069,271 | B2 | 11/2011 | Brunet et al. |
| 8,140,786 | B2 | 3/2012 | Bunte et al. |
| 8,219,524 | B2 | 7/2012 | Gokhale |
| 8,307,177 | B2 | 11/2012 | Prahlad et al. |
| 8,335,776 | B2 | 12/2012 | Gokhale |
| 8,396,838 | B2 | 3/2013 | Brockway et al. |
| 8,407,190 | B2 | 3/2013 | Prahlad et al. |
| 8,433,679 | B2 | 4/2013 | Crescenti et al. |
| 8,434,131 | B2 | 4/2013 | Varadharajan et al. |
| 8,473,594 | B2 | 6/2013 | Astete et al. |
| 8,495,108 | B2 | 7/2013 | Nagpal et al. |
| 8,620,870 | B2 | 12/2013 | Dwarampudi et al. |
| 8,805,788 | B2 | 8/2014 | Gross, IV et al. |
| 9,098,495 | B2 | 8/2015 | Gokhale |
| 9,098,514 | B2 | 8/2015 | Dwarampudi et al. |
| 9,588,972 | B2 | 3/2017 | Dwarampudi et al. |
| 2003/0182427 | A1 | 9/2003 | Halpern |
| 2004/0205152 | A1 | 10/2004 | Yasuda et al. |

(56) References Cited

U.S. PATENT DOCUMENTS

| | | | |
|---|---|---|---|
| 2005/0262207 | A1 | 11/2005 | Glickman et al. |
| 2005/0268298 | A1 | 12/2005 | Hunt et al. |
| 2006/0059253 | A1 | 3/2006 | Goodman et al. |
| 2006/0224846 | A1 | 10/2006 | Amarendran et al. |
| 2007/0203938 | A1 | 8/2007 | Prahlad et al. |
| 2007/0234302 | A1 | 10/2007 | Suzuki |
| 2008/0163206 | A1 | 7/2008 | Nair |
| 2008/0244177 | A1 | 10/2008 | Crescenti |
| 2008/0270547 | A1 | 10/2008 | Glickstien et al. |
| 2008/0320319 | A1 | 12/2008 | Muller et al. |
| 2009/0144416 | A1 | 6/2009 | Chatley et al. |
| 2009/0327477 | A1 | 12/2009 | Madison, Jr. |
| 2010/0017884 | A1* | 1/2010 | Kim .................. G06F 21/10 726/26 |
| 2010/0070725 | A1 | 3/2010 | Prahlad |
| 2010/0218183 | A1 | 8/2010 | Wang et al. |
| 2010/0274981 | A1 | 10/2010 | Ichikawa |
| 2011/0087632 | A1 | 4/2011 | Subramanian et al. |
| 2011/0307887 | A1 | 12/2011 | Huang et al. |
| 2012/0137292 | A1 | 5/2012 | Iwamatsu et al. |
| 2012/0254364 | A1 | 10/2012 | Vijayan |
| 2013/0061014 | A1 | 3/2013 | Prahlad et al. |
| 2013/0326218 | A1 | 12/2013 | Burch et al. |
| 2015/0150114 | A1 | 5/2015 | Kuker et al. |
| 2015/0254572 | A1 | 9/2015 | Blohm et al. |
| 2015/0350321 | A1 | 12/2015 | Klose et al. |
| 2016/0308720 | A1 | 10/2016 | Kumarasamy et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

"Global Repository Cell (GRC)—Frequently Asked Questions (Early Release)" [online], Accessed on Apr. 16, 2014, Retrieved from the Internet: URL: http://documentation.commvault.com/commvault/v10/article?p=features/robo/grc_faq.htm, 3 pages.

"Global Repository Cell (GRC)—Getting Started" [online], Accessed on Apr. 16, 2014, Retrieved from the Internet: URL: http://documentation.commvault.com/hds/v10/article?p=features/robo/grc_setup.htm, 8 pages.

"Global Repository Cell (GRC)—Overview" [online], Accessed on Apr. 16, 2014 Retrieved from the Internet: URL: http://documentation.commvault.com/hds/v10/article?p=features/robo/grc_basic.htm, 3 pages.

"Global Repository Cell (GRC)—Prerequisites (Early Release)" [online], Accessed on Apr. 16, 2014, Retrieved from the Internet: URL: http://documentation.commvault.com/hds/v10/article?p=features/robo/grc_req.htm, 3 pages.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Brandon, J., "Virtualization Shakes Up Backup Strategy," <http://www.computerworld.com>, Internet accessed on Mar. 6, 2008, 3 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, Internet accessed Mar. 24, 2008, 2 pages.

CommVault Systems, Inc., "Enhanced Protection and Manageability of Virtual Servers," Partner Solution Brief, 2008, 6 pages.

Commvault, "Automatic File System Multi-Streaming," http://documentation.commvault.com/hds/release 7 0 0/books online 1/english us/feature, downloaded Jun. 4, 2015, 4 pages.

Davis, D., "3 VMware Consolidated Backup (VCB) Utilities You Should Know," Petri IT Knowlegebase, <http://www.petri.co.il/vmware-consolidated-backup-utilities.htm>, Internet accessed on Jul. 14, 2008, 7 pages.

Davis, D., "Understanding VMware VMX Configuration Files," Petri IT Knowledgebase, <http://www.petri.co.il/virtual.sub.--vmware.sub.--vmx.sub.--configura- tion.sub.--files.htm>, Internet accessed on Jun. 19, 2008, 6 pages.

Davis, D., "VMware Server & Workstation Disk Files Explained," Petri IT Knowledgebase, <http://www.petri.co.il/virtual.sub.--vmware.sub.--files.sub.--explain- ed.htm>, Internet accessed on Jun. 19, 2008, 5 pages.

Davis, D., "VMware Versions Compared," Petri IT Knowledgebase, <http://www.petri.co.il/virtual.sub.--vmware.sub.--versions.sub.--comp- ared.htm>, Internet accessed on Apr. 28, 2008, 6 pages.

Eitel, "Backup and Storage Management in Distributed Heterogeneous Environments," IEEE, Jun. 12-16, 1994, pp. 124-126.

European Search Report for European Application No. 11830025.0, dated Jul. 18, 2014, 12 pages.

Gait, J., "The Optical File Cabinet: A Random-Access File System for Write-Once Optical Disks," IEEE Computer, vol. 21, No. 6, pp. 11-22 (Jun. 1988).

Hitachi, "Create a Virtual Machine—VM Lifecycle Management—Vmware," http://documentation.commvault.com/hds/v10/article?p=-products/vs vmware/vm provisio . . . , downloaded Apr. 28, 2015, 2 pages.

Hitachi, "Frequently Asked Questions—Virtual Server Agent for Vmware," http://documentation.commvault.com/hds/v10/article?p=products/vs vmware/faqs.htm, downloaded Apr. 28, 2015, 11 pages.

Hitachi, "Overview—Virtual Server Agent for VMware," http://documentation.commvault.com/hds,v1 0/article?p=products/vs vmware/overview.htm, downloaded Apr. 28, 2013, 3 pages.

Hitachi, "Recover Virtual Machines or VM Files—Web Console," http://documentation.commvault.com/hds/v10/article?p+products/vs vmware/vm archivin . . . , downloaded Apr. 28, 2015, 2 pages.

International Preliminary Report on Patentability and Written Opinion for PCT/US2011/054374, dated Apr. 11, 2013, 6 pages.

International Search Report and Written Opinion for PCT/US2011/054378, dated May 2, 2012, 9 pages.

Jander, M., "Launching Storage-Area Net," Data Communications, US, McGraw Hill, Ny, vol. 27, No. 4 (Mar. 21, 1998), pp. 64-72.

Microsoft Corporation, "How NTFS Works," Windows Server TechCenter, updated Mar. 28, 2003, internet accessed Mar. 26, 2008, 26 pages.

Rosenblum et al., "The Design and Implementation of a Log-Structured File System," Operating Systems Review SIGOPA, vol. 25, No. 5, New York, US, pp. 1-15 (May 1991).

Sanbarrow.com, "Disktype-table," <http://sanbarrow.com/vmdk/disktypes.html>, internet accessed on Jul. 22, 2008, 4 pages.

Sanbarrow.com, "Files Used by a VM," <http://sanbarrow.com/vmx/vmx-files-used-by-a-vm.html>, internet accessed on Jul. 22, 2008, 2 pages.

Sanbarrow.com, "Monolithic Versus Split Disks," <http://sanbarrow.com/vmdk/monolithicversusspllit.html>, internet accessed on Jul. 14, 2008, 2 pages.

VMware, Inc., "Open Virtual Machine Format," <http://www.vmware.com/appliances/learn/ovf.html>, internet accessed on May 6, 2008, 2 pages.

VMware, Inc., "OVF, Open Virtual Machine Format Specification, version 0.9," White Paper, <http://www.vmware.com>, 2007, 50 pages.

VMware, Inc., "The Open Virtual Machine Format Whitepaper for OVF Specification, version 0.9," White Paper, <http://www.vmware.com>, 2007, 16 pages.

(56) References Cited

OTHER PUBLICATIONS

VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision 20080411, 2008, 44 pages.
VMware, Inc., "Virtual Disk Format 1.1," VMware Technical Note, <http://www.vmware.com>, Revision 20071113, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks.sub.--types.sub.--gsx.ht- ml>, internet accessed on Mar. 25, 2008, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http://www.vmware.com/support/ws5/doc/ws.sub.--preserve.sub.--sshot.su- b.--linear.html>, internet accessed on Mar. 25, 2008, 1 page.
VMware, Inc., "VMware Workstation 5.0, Snapshots in a Process Tree," <http://www.vmware.com/support/ws5/doc/ws.sub.--preserve.sub.--sshot.s- ub.--tree.html>, internet accessed on Mar. 25, 2008, 1 page.
VMware, Inc., "VMware Workstation 5.5, What Files Make Up a Virtual Machine?" <http://www.vmware.com/support/ws55/doc/ws.sub.--learning.su- b.--files.sub.--in.sub.--a.sub.--vm.html>, internet accessed on Mar. 25, 2008, 2 pages.
Wikipedia, "Cluster (file system)," <http://en.wikipedia.org/wiki/Cluster.sub.--%28file.sub.--system%29>- ;, internet accessed Jul. 25, 2008, 1 page.
Wikipedia, "Cylinder-head-sector," <http://en.wikipedia.org/wiki/Cylinder-head-sector>, internet accessed Jul. 22, 2008, 6 pages.
Wikipedia, "File Allocation Table," <http://en.wikipedia.org/wiki/File.sub.--Allocation.sub.--Table>, internet accessed on Jul. 25, 2008, 19 pages.
Wikipedia, "Logical Disk Manager," <http://en.wikipedia.org/wiki/Logical.sub.--Disk.sub.--Manager>, internet accessed Mar. 26, 2008, 3 pages.
Wikipedia, "Logical Volume Management," <http://en.wikipedia.org/wiki/Logical.sub.--volume.sub.--management>- ;, internet accessed on Mar. 26, 2008, 5 pages.
Wikipedia, "Storage Area Network," <http://en.wikipedia.org/wiki/Storage.sub.--area.sub.--network>, internet accessed on Oct. 24, 2008, 5 pages.
Wikipedia, "Virtualization," <http://en.wikipedia.org/wiki/Virtualization>, internet accessed Mar. 18, 2008, 7 pages.
U.S. Appl. No. 61/100,686 for Kottomtharayil, filed Sep. 26, 2008.
U.S. Appl. No. 61/164,803 for Muller, filed Mar. 30, 2009.
Examination Report in European Patent Application No. 11830025.0, dated Nov. 10, 2017, 4 pages.
International Search Report and Written Opinion for PCT/US2011/054374, dated May 2, 2012, 9 pages.

* cited by examiner

EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM

CROSS-REFERENCE TO RELATED APPLICATIONS

This application is a continuation of U.S. patent application Ser. No. 14/816,815, entitled, "EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM," filed Aug. 3, 2015, now U.S. Pat. No. 9,588,972, which is a continuation of U.S. patent application Ser. No. 13/926,332, entitled "EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM," filed Jun. 25, 2013, now U.S. Pat. No. 9,098,514, which is a divisional of U.S. patent application Ser. No. 13/250,962, entitled "EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM," filed Sep. 30, 2011, now U.S. Pat. No. 8,620,870, which claims the benefit of U.S. Provisional Patent Application No. 61/388,574, entitled "DETECTING AND ARCHIVING IDLE VIRTUAL MACHINES," filed Sep. 30, 2010, each of which is incorporated by reference in its entirety.

BACKGROUND

Comprehensive and full-featured data management systems may be prohibitively expensive, require an operator with specialized expertise, and consume substantial processing and data storage resources. However, full-featured data management systems can also offer substantial benefits to an organization, including, top-down, policy-driven data management; data replication and protection; cloud storage integration; storage resource management, analysis, optimization, and reporting; data archiving, deduplication, compression and encryption; electronic discovery (E-discovery), privacy violation, retention life cycle, and compliance management; backup and recovery; content indexing; data classification; enterprise and collaborative data mining and search; migration from legacy data storage solutions; virtual server protection; disaster recovery; access control and security; and many others.

One example of a data management system that provides such features is the Simpana storage management system by CommVault Systems of Oceanport, N.J. The Simpana system leverages a modular storage management architecture that may include, among other things, storage manager components, client or data agent components, and media agent components as further described in U.S. Pat. No. 7,246,207, filed Apr. 5, 2004, entitled SYSTEM AND METHOD FOR DYNAMICALLY PERFORMING STORAGE OPERATIONS IN A COMPUTER NETWORK. The Simpana system also may be hierarchically configured into backup cells to store and retrieve backup copies of electronic data as further described in U.S. Pat. No. 7,395,282, filed Jul. 15, 1999, entitled HIERARCHICAL BACKUP AND RETRIEVAL SYSTEM.

To avoid the overhead of a comprehensive data management system, an organization may initially choose to forego these advantages and instead deploy limited-feature data management software applications that provide piecemeal feature coverage. For example, an organization may choose to deploy a first limited-feature backup application that performs data backups of a limited number of client computers as well as a second limited-feature archive application that archives data. However, as an organization's data management needs grow and diversify, the organization may struggle to make a smooth transition from using a piecemeal patchwork of limited-feature software applications to using a comprehensive and full-featured data management system that provides an overarching data management framework. For example, a comprehensive and full-featured data management system may be unable to integrate the data and/or metadata previously generated by each limited-feature application used by the organization.

As a first specific example, an organization may initially use a limited-feature module to manage and provision virtual machines (VM), but later wish to receive additional features related to the management of virtual machines. In general, virtualization refers to the simultaneous hosting of one or more operating systems on a physical computer. Such virtual operating systems and their associated virtual resources are called virtual machines. Virtualization software sits between the virtual machines and the hardware of the physical computer. One example of virtualization software is ESX Server, by VMware, Inc. of Palo Alto, Calif. Other examples include Microsoft Virtual Server and Microsoft Windows Server Hyper-V, both by Microsoft Corporation of Redmond, Wash., and Sun xVM by Oracle America Inc. of Santa Clara, Calif.

Virtualization software provides to each virtual operating system virtual resources, such as a virtual processor, virtual memory, a virtual network device, and a virtual disk. Each virtual machine has one or more virtual disks. Virtualization software typically stores the data of virtual disks in files on the file system of the physical computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

One advantage of virtualization is that virtual machines can be easily created. For example, organizations often provide web-based or other interfaces to virtualization software that allow users to easily create virtual machines. Often-times, however, users do not delete virtual machines when the users no longer have need of the virtual machines, and the virtual machines may be completely or nearly completely unused. However, such virtual machines, even unused, consume resources (e.g., memory, storage space, processor cycles) of the physical computer on which the virtualization software operates. In certain cases, the resources of the physical computer may be fully or nearly fully utilized by the virtual machines that the physical computer hosts. In such cases, users may be unable to create new virtual machines until the physical computer becomes less utilized, which can occur if virtual machines are shut down or deleted.

As other examples, an organization may initially use a limited-feature module to (a) provide private search capabilities, (b) perform backups and other secondary storage operations for a limited number of client computers, (c) create content stores, or (d) perform other data management operations. However, the organization may later wish to receive additional, value-added features related to these tasks.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following detailed description.

DETAILED DESCRIPTION

Figure 1:
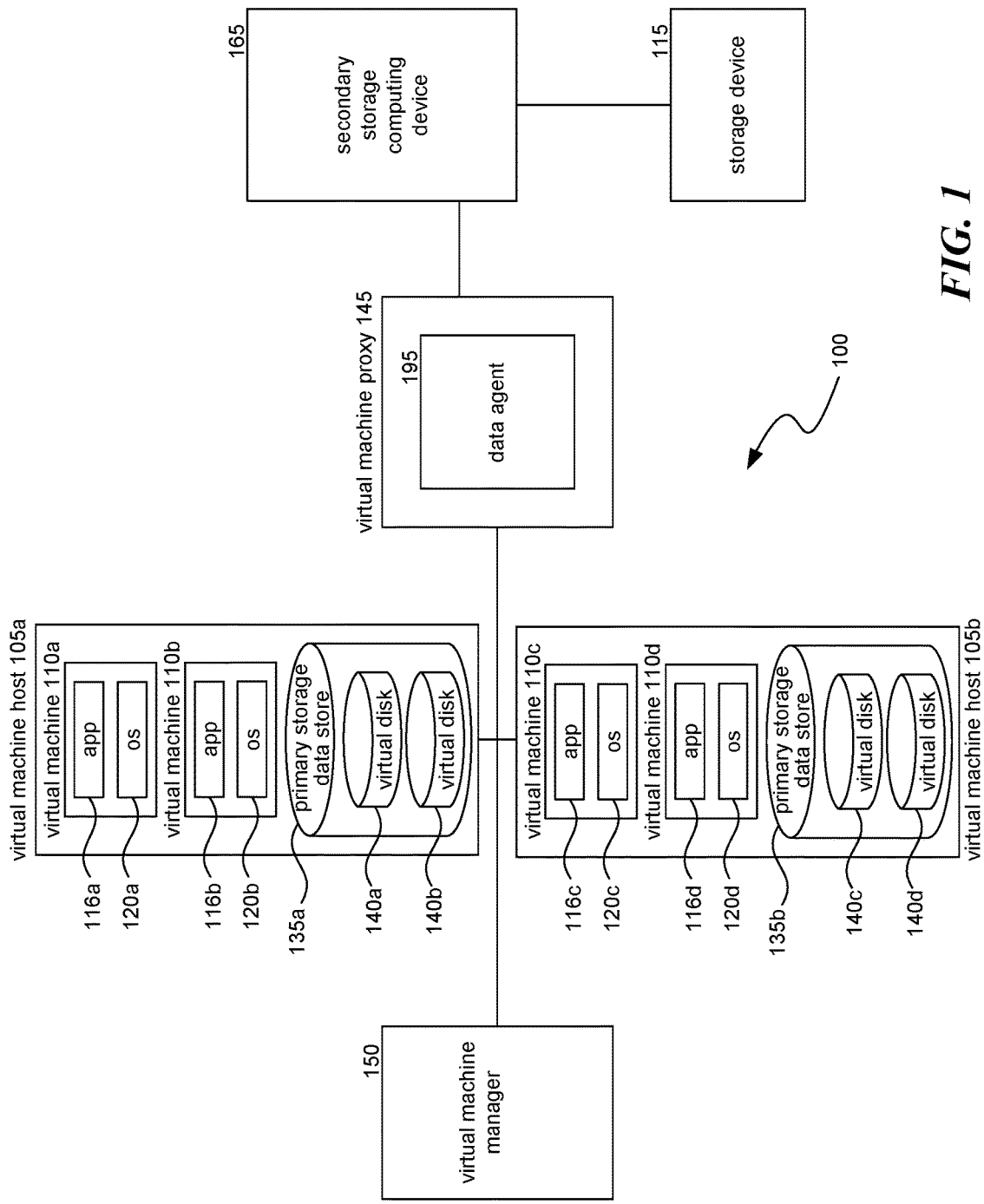
FIG. 1 is a block diagram illustrating an environment in which a system for virtual machine life cycle management operates.

The headings provided herein are for convenience only and do not necessarily affect the scope or meaning of the disclosure.

Overview

Software, firmware, and systems are described herein that permit an organization to interface with or "dock" previously-utilized, limited-feature data management modules with a full-featured data management system. By docking limited-feature data management modules to a full-featured data management system, metadata, profiles/configurations and data from various limited-feature data management modules can be integrated and utilized more efficiently and effectively. Moreover, additional data management features can be provided to users using a more seamless transition.

This application first describes in detail one example for ease of understanding before providing details on a more generalized system. In other words, this application first describes, with respect to FIGS. 1-4, one particular example of a data management feature, VM life cycle management. Second, after providing an introduction to the VM life cycle management system, the application describes generally how limited-feature data management modules may dock or interface with a full-featured data management system in order to provide additional data management features in a seamless fashion.

More specifically, a software, firmware, and/or hardware system for VM life cycle management is disclosed (the "virtual machine (VM) life cycle management system"). The VM life cycle management system provides management for numerous phases in the life cycle of a virtual machine, including creating the virtual machine initially; providing ongoing policy-based management and backup protection of the virtual machine; detecting, shutting down and/or archiving the virtual machine when it has been idle for a period of time; and restoring the virtual machine after it has been archived.

Virtual machines are hosted by virtualization software that operates on computing systems. Such virtualization software may be referred to as a virtual machine host. The VM life cycle management system monitors virtual machines to detect idle virtual machines. For example, the VM life cycle management system may query virtual machine hosts or another server that manages virtual machines.

When the VM life cycle management system determines that a virtual machine has been idle for a first period of time, the VM life cycle management system shuts down the virtual machine. After it has been shut down, the virtual machine no longer utilizes memory and processor cycles of the computing system hosting the virtual machine. Accordingly, the computing system can utilize such resources for other purposes. Additionally, the system and methods described herein that relate to shutting down idle virtual machines may also be applied to idle physical machines so that the system shuts down and powers off physical machines that are determined to be idle for some predefined period of time. By shutting down idle machines, either virtual or physical, the life cycle management system may assist in meeting "green energy" certifications, standards, or other benchmarks, such as being a Green Energy Compliant System.

After the virtual machine has been shut down for a second period of time, the VM life cycle management system archives the virtual machine file associated with the virtual machine by copying the virtual machine file to a storage device and replacing the virtual machine file with a stub. The stub points or refers to the location of the copied virtual machine file. After the virtual machine file has been archived, the virtual machine no longer utilizes as much storage space of the computing system as the virtual machine utilized before the archive process.

The VM life cycle management system may replace an icon normally associated with the virtual machine with a new icon corresponding to archived virtual machines, thereby providing a visual indication that the virtual machine has been archived. If the VM life cycle management system detects that a user selects the archived virtual machine, the VM life cycle management system can provide an option to restore and restart the virtual machine. For example, upon detecting a right-click of the new icon, the VM life cycle management system can provide a selectable right-click option to restore and restart the virtual machine. If the VM life cycle management system detects that the option is selected, the VM life cycle management system can retrieve and restore the archived virtual machine file to the computing system, and then start the virtual machine.

The application also provides below a first example of how a limited-feature virtual machine (VM) life cycle management module, which provides only a subset of the features of the VM life cycle management system, may be docked with a full-featured data management system in order to provide additional virtual machine management features.

Finally, the discussion of FIGS. 8-11 provides additional specific examples of limited-feature data management modules that may be docked with a full-featured data management system in order to provide additional features, including: (a) providing private search capabilities, (b) merging backup or other secondary data from different groups of client computers, (c) providing top-down data management from a hosted software service, and (d) creating backup, archive or other secondary copies of data stores in secondary storage. Of course, many other additional features are possible.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Illustrative Environment

FIG. 1 is a block diagram illustrating an environment 100 in which the VM life cycle management system operates. The environment 100 includes multiple virtual machine hosts 105 operating or executing on physical computing systems, a virtual machine manager 150, a virtual machine proxy 145, a secondary storage computing device 165 (alternatively referred to as a "media agent") and one or more storage devices 115. The virtual machine hosts 105, the virtual machine manager 150, the virtual machine proxy 145, and the secondary storage computing device 165 are connected to each other via a network, which may be a LAN, a WAN, the public Internet, some other type of network, or some combination of the above.

The virtual machine host 105 (e.g., a VMware ESX server, a Microsoft Virtual Server, a Microsoft Windows Server Hyper-V host, or any other type of virtualization software) hosts one or more virtual machines 110 (e.g., VMware virtual machines, Microsoft virtual machines, or any other type of virtual machine). Each virtual machine 110 has its own operating system 120 and one or more applications 116 executing on the operating system or loaded on the operating system. The operating systems 120 may be any type of operating system 120 (e.g., Microsoft Windows, Linux operating systems, Sun Solaris operating systems, UNIX operating systems, or any other type of operating system) that can be hosted by the virtual machine host 105. The applications 116 may be any applications (e.g., database applications, file server applications mail server applications, web server applications, transaction processing applications, or any other type of application) that may run on the operating systems 120.

Each virtual machine host 105 has a primary storage data store 135 that stores the virtual disks 140 of the virtual machines 110. Virtual disk 140a is used by virtual machine 110a, and virtual disk 140b is used by virtual machine 110b. Although each virtual machine 110 is shown with only one virtual disk 140, each virtual machine 110 may have more than one virtual disk 140 in the primary storage data store 135. A virtual disk 140 corresponds to one or more virtual machine disk files (e.g., one or more *.vmdk, *.vhd files, or any other type of file) on the primary storage data store 135. The primary storage data store 135 stores a primary copy of the data of the virtual machines 110. Additionally or alternatively, the virtual disks 140 may be stored by other storage devices in the environment 100 (e.g., on storage devices in a Storage Area Network (SAN)).

The virtual machine manager 150 (e.g., a VMware Virtual Center server, a Microsoft System Center Virtual Machine Manager, or any other virtual machine manager software) manages or facilitates management of the virtual machines 110 and/or the virtual machine hosts 105. The virtual machine manager 150 and the virtual machine hosts 105 may each include an Application Programming Interface (API) component to expose or provide various types of APIs, such as an API for accessing and manipulating virtual disks 140, and an API for performing other functions related to management of virtual machines 110.

The virtual machine proxy 145 includes a data agent 195 configured to perform storage operations on data of virtual machines 110. The data agent 195 is configured to access the primary storage data stores 135. The secondary storage computing device 165 can initiate storage operations on the data of the virtual machines 110 and assist in the transfer of virtual machine data by the virtual machine proxy 145 to the storage device 115. The secondary storage computing device 165 (or the virtual machine proxy 145, or any other component described herein) may perform functions such as encrypting, compressing, single or variable instancing, deduplicating, and/or content indexing data that is transferred to the storage device 115.

Illustrative System

Figure 2:
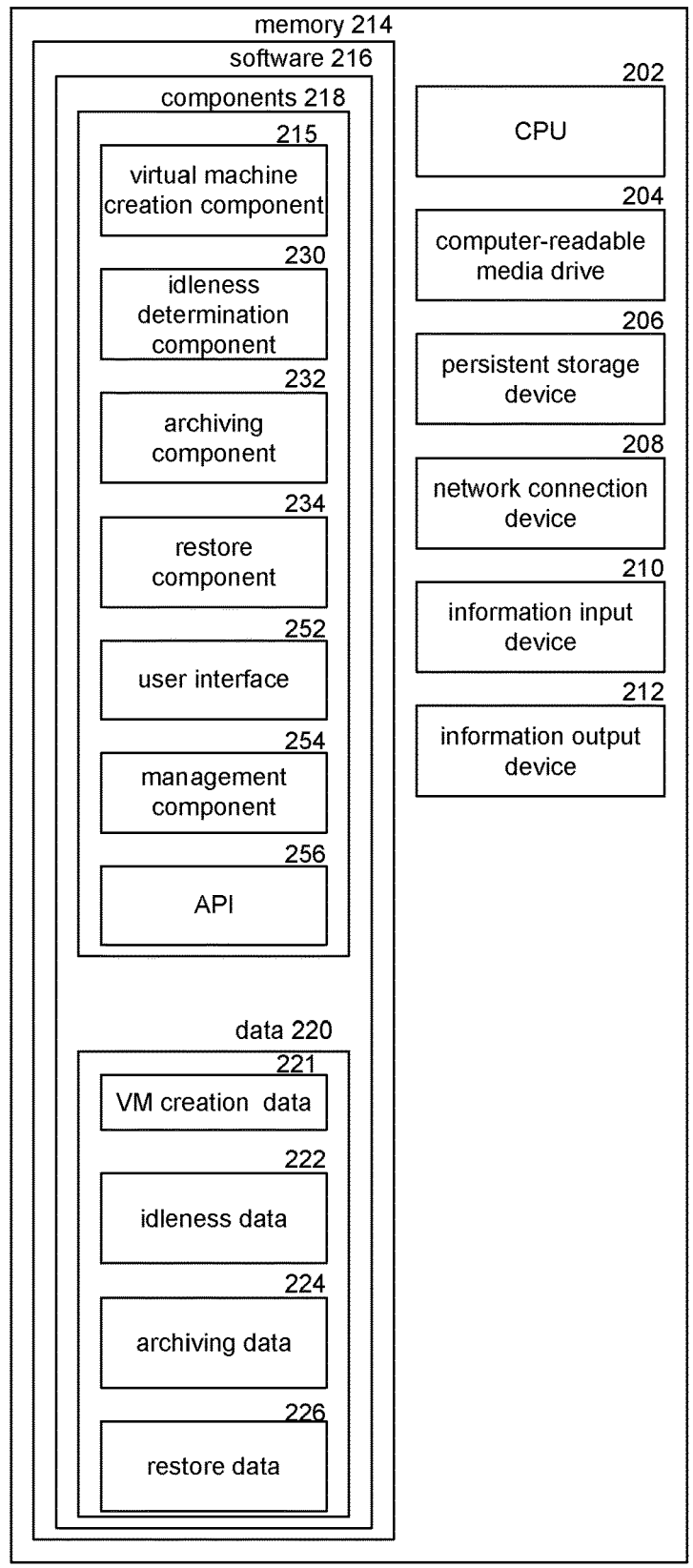
FIG. 2 is a block diagram illustrating details of a computing system that can perform virtual machine life cycle management, including detecting and archiving idle virtual machines.

FIG. 2 is a block diagram illustrating in more detail a computing system 200 that can perform the virtual machine life cycle management functionality described herein. The computing system 200, or VM life cycle management system, includes a memory 214. The memory 214 includes software 216 incorporating components 218 and data 220 typically used by the VM life cycle management system 200. The data 220 includes VM creation data 221, idleness data 222, archiving data 224, and restore data 226. The VM creation data 221 can include policies, rules or criteria for creating new virtual machines. The idleness data 222 can include rules or criteria for detecting idle virtual machines 110 (e.g., virtual machines 110 that are not utilized or are substantially unused for a predetermined period of time). The archiving data 224 can include rules or criteria for determining if and when virtual machine files are to be archived. The restore data 226 can include data for restoring archived virtual machine files, including policies, rules or criteria for restoring archived virtual machines.

The components 218 may include subcomponents, modules, or other logical entities that assist with or enable the performance of some or all of the functionality. For example, the components 218 include a virtual machine creation component 215 to fulfill requests to create new virtual machines using the VM creation data 221. The virtual machine creation component may for example, identify available resources and apply policies during virtual machine creation. The components 218 also include an idleness determination component 230 that uses the idleness data 222 to determine that a virtual machine 110 has been idle. The components 218 also include an archiving component 232 that archives data associated with virtual machines 110 using the archiving data 224. The components 218 also include a restore component 234 that uses the restore data 226 to restore data associated with virtual machines 110. The components also include a user interface component 252 that provides a user interface for managing virtual machines 110, a management component 254 that provides virtual machine 110 management functionality, and an API component 256 that provides functions that enable programmatic interaction with the virtual machine manager 150, the virtual machines 110, and/or the virtual machine hosts 105.

While items 218 and 220 are illustrated as stored in memory 214, those skilled in the art will appreciate that these items, or portions of them, may be transferred between memory 214 and a persistent storage device 206 (for example, a magnetic hard drive, a tape of a tape library, etc.) for purposes of memory management, data integrity, and/or other purposes.

The computing system 200 further includes one or more central processing units (CPU) 202 for executing software 216, and a computer-readable media drive 204 for reading information or installing software 216 from tangible computer-readable storage media, such as a floppy disk, a CD-ROM, a DVD, a USB flash drive, and/or other tangible computer-readable storage media. The computing system 200 also includes one or more of the following: a network connection device 208 for connecting to a network, an information input device 210 (for example, a mouse, a keyboard, etc.), and an information output device 212 (for example, a display).

The computing system 200 can be implemented by or in any of the components illustrated in FIG. 1, such as by or in the virtual machine hosts 105, the virtual machine manager 150, the virtual machine proxy 145, or the secondary storage computing device 165. In some examples, some or all of the software 216, components 218, and data 220 of the computing system may be implemented as a plug-in to third-party virtualization software, such as the VMware ESX Server or VMware vCenter software. In some examples, the plug-in may be downloaded to the various virtual machine hosts 105, e.g., from a server running VMware vCenter software and/or system components such as the virtual machine manager 150. The functionality of the computing system 200 may be performed by any or all of such components. For example, the virtual machine manager 150 may include the user interface component 252 and the management component 254 to provide a user interface for managing virtual machines 110. The secondary storage computing device 165 may include the archiving component 232 and the restore component 234 to archive and restore virtual machine data. Accordingly, the components 218 are not limited to being implemented by or in a single computing device.

Illustrative Virtual Machine Life Cycle Management Process

Figure 3:
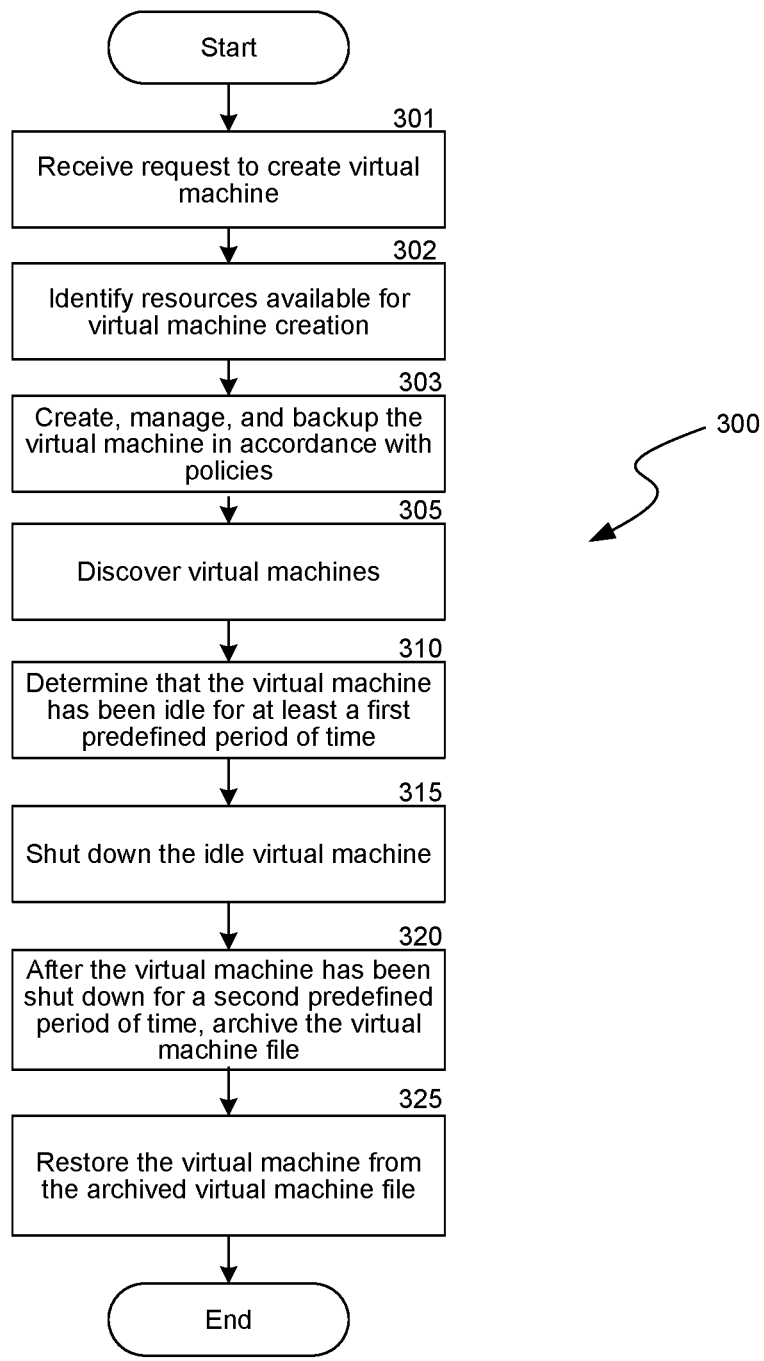
FIG. 3 is a flow diagram illustrating a virtual machine life cycle management process that includes detecting and archiving idle virtual machines and is implemented by the virtual machine life cycle management system.

FIG. 3 is a flow diagram illustrating a virtual machine life cycle management process 300, including detecting and archiving idle virtual machines 110, implemented by the VM life cycle management system 200. The process 300 begins at step 301, where the VM life cycle management system 200 receives a request to create a virtual machine 110. For example, the VM life cycle management system 200 may provide a graphical user interface that permits a user to indicate the specifications for a new virtual machine 110, including for example the operating system, application programs, and virtual resources needed, such as virtual processing power, virtual memory, virtual network devices, and virtual disk space. At step 302, the VM life cycle management system 200 identifies resources that are available for creating new virtual machines. For example, the VM life cycle management system 200 may access stored data that identifies which virtual machine hosts 105 are on the network and which primary storage data stores 135 are available to store virtual disks 140. The VM life cycle management system 200 may also access data regarding the virtual resources or other resources that are already being consumed by the existing virtual machines running on each of the virtual machine hosts 105. As another example, the VM life cycle management system may access stored data regarding the total hosting capacity or configuration of each virtual machine host 105, and/or the capacity or configuration of the various primary storage data stores 135. The VM life cycle management system may determine some or all of the resource availability information dynamically by polling resources, or by crawling or spidering the network. In some examples, the system may use a combination of static stored data and dynamic techniques to determine resource availability.

At step 303, the VM life cycle management system creates a new virtual machine 110 and associated virtual disks 140 in accordance with applicable virtual machine policies, e.g., using APIs provided by the API component 256. The applicable virtual machine policies may require that the VM life cycle management system select a virtual machine host 105 for the new virtual machine in order to facilitate load distribution. For example, the virtual machine policy may dictate that a new virtual machine should be hosted by the virtual machine host 105 in the network that is currently providing the lowest amount of virtual resources to other virtual machines (e.g., either as a percentage of its total resources and/or in absolute terms). As another example, the virtual machine policy may select the virtual machine host 105 for the new virtual machine using a round-robin technique. Similarly, the policy may specify that the primary storage data store 135 for storing the new virtual disks 140 should be selected in order to facilitate load distribution.

Once the virtual machine 110 has been created, at step 303, the VM life cycle management system 200 may also manage various backup and other secondary storage operations that create secondary copies of the virtual machine 110 and its associated virtual disks 140, such as snapshot copies and backup copies. Also, at step 303, the VM life cycle management system may provide user interfaces that permit users to manage aspects of the virtual machine 110, including, for example, altering its specification, generating reports regarding its performance and use of virtual resources, and other management tasks.

At step 305 the VM life cycle management system 200 discovers virtual machines 110 in the network, including the virtual machine 110 created at step 303. For example, the VM life cycle management system 200 may use APIs provided by the API component 256 to discover virtual machines 110. As another example, the VM life cycle management system 200 may query a virtual machine host 105 or a virtual machine manager 150 in order to discover virtual machines 110. Additionally or alternatively, the VM life cycle management system 200 may analyze processes and ascertain that the processes match a particular signature associated with virtual machines 110.

As another example, to discover virtual machines 110 the VM life cycle management system 200 may include logic for crawling or spidering the network. The VM life cycle management system 200 may utilize route tables or other data structures and crawl or spider various computing systems that could potentially host virtual machines 110 to determine whether or not the computing systems are hosting virtual machines 110. Accordingly, instead of relying on a static input (e.g., a name of a virtual machine host 105 or the virtual machine manager 150) to discover virtual machines 110, the VM life cycle management system 200 could dynamically discover virtual machines 110 using the dynamic techniques described herein. Additionally or alternatively, the VM life cycle management system 200 can use a combination of static and dynamic techniques to discover virtual machines 110. More details as to the discovery, detection, and/or identification of virtual machines 110 are described in commonly-assigned co-pending U.S. Patent Application Publication Number 2010/0070725, the entirety of which is incorporated by reference herein.

As another example, the VM life cycle management system 200 can create and maintain a data structure containing entries for virtual machines 110, as well as an indication of whether or not each virtual machine 110 is active and the last time the virtual machine 110 was found to be active. The VM life cycle management system 200 can access the data structure and use the entries as a starting point for discovering virtual machines 110.

At step 310, the VM life cycle management system 200 determines that the created virtual machine 110 has been idle for at least a first predefined period of time. For example, to determine that a virtual machine 110 has been idle, the VM life cycle management system 200 may intercept alerts transmitted with respect to the virtual machine 110, analyze the content of the alerts, and look for specific content in the alerts. If the VM life cycle management system 200 finds that the alerts contain the specific content, the VM life cycle management system 200 may determine that the virtual machine 110 associated with the alerts has been idle for at least the first predetermined period of time. As another example, the VM life cycle management system 200 may call an API (e.g., an API of the virtual machine manager 150 or of a virtual machine host 105) in order to determine that a virtual machine 110 has been idle for a period of time.

As another example, the VM life cycle management system 200 may determine that all or substantially all of the application-level processes of the virtual machine 110 have been idle for at least the first predefined period of time. There may be operating system-level processes that have been running, but the VM life cycle management system 200 may ignore such processes to focus on application-level processes. The VM life cycle management system 200 may look for activity above and beyond operating system-level activity, such as looking to see if any applications 116 are active. To determine such activity, the VM life cycle management system 200 may call APIs (e.g., an API of a virtual machine operating system 120) to determine the level or extent of idleness of applications 116 running on the virtual machine 110. Additionally or alternatively, the VM life cycle management system may monitor application-level events, such as keyboard and mouse events. Such events may show that a user has logged onto a virtual machine 110 and has been utilizing the virtual machine 110. As another example, the VM life cycle management system 200 may monitor user and/or process activity on the virtual machine 110, such as by monitoring metadata that may indicate whether certain user-level processes are active.

After determining that the virtual machine 110 has been idle for at least the first predefined period of time, at step 315 the VM life cycle management system 200 shuts down the idle virtual machine 110. For example, the VM life cycle management system 200 may call an API (e.g., an API of the virtual machine manager 150 or of a virtual machine host 105) to cause the virtual machine 110 to shut down. As another example, the VM life cycle management system 200 may issue commands to the virtual machine host 105 or the virtual machine manager 150 to cause the virtual machine 110 to shut down. In this context, shut down can mean that the virtual machine 110 is completely shut down (e.g., powered off) or is only partially shut down (e.g., in a standby state or hibernating).

After shutting down the virtual machine 110, at step 320 the VM life cycle management system 200 starts a timer for a second predefined period of time. The VM life cycle management system 200 may require the virtual machine 110 to be shut down for the entirety of the second predefined period of time, or may simply require that the virtual machine 110 be shut down at the conclusion of the second predefined period of time. The VM life cycle management system 200 may use default values for the first and second predefined periods of time. For example, the VM life cycle management system 200 may set the first predefined period of time to be equal to 90 days, and the second predefined period of time to be equal to 30 days. Additionally or alternatively, the VM life cycle management system 200 can allow a user to configure the first and second predefined periods of time.

After the timer expires, the VM life cycle management system 200 archives the virtual machine file associated with the virtual machine 110. In this context, a virtual machine file can include any file or data object utilized by or associated with the virtual machine 110 (e.g., the *.vmdk utilized by VMware virtual servers, the *.vhd files utilized by Microsoft virtual servers, or any other type of file or data object).

The VM life cycle management system 200 archives the virtual machine file by copying the virtual machine file to the storage device 116. The VM life cycle management system 200 may preserve the state of the virtual machine file, so that the VM life cycle management system 200 can restart the virtual machine 110 at that same point upon restoration. The VM life cycle management system 200 may also perform other operations upon the virtual machine file, such as compressing the virtual machine file, encrypting the virtual machine file, and/or single-instancing or deduplicating data objects within the virtual machine file. After the VM life cycle management system 200 has copied the virtual machine file to the storage device 116, the VM life cycle management system 200 replaces the virtual machine file with a stub. A stub is typically a small data object that indicates, points to or refers to the location of the secondary copy of the virtual machine file and facilitates recovery of the virtual machine file. More details as to archiving operations may be found in the commonly-assigned currently pending U.S. Patent Application Number 2008/0229037, the entirety of which is incorporated by reference herein. The stub allows the virtual machine file to be retrieved in case a user wishes to recover the virtual machine file.

The VM life cycle management system 200 may apply archive rules or criteria to archive virtual machine files. Such archive rules or criteria may be based on any combination of data object type, data object age, data object size, percentage of disk quota, remaining storage, and/or other factors. The VM life cycle management system 200 could also apply policies such as storage policies to determine if and when to archive virtual machine files. For example, the virtual machine 110 could be associated with an archive policy that indicates that if the virtual machine 110 has been idle for a first predefined period of time, the virtual machine is to be shut down and then immediately archived. As another example, a virtual machine 110 could be associated with a storage policy that indicates that regardless of whether or not the virtual machine 110 is idle, the virtual machine 110 is never to be shut down or archived.

Figure 4:
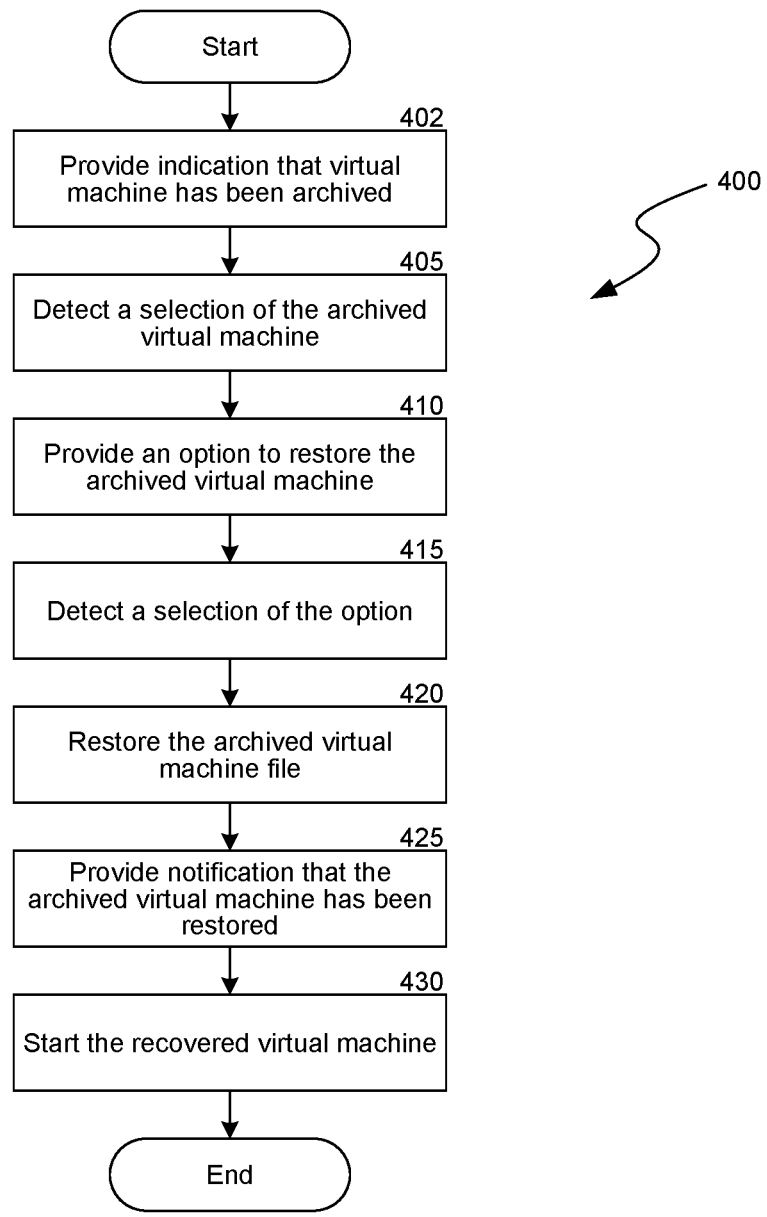
FIG. 4 is a flow diagram illustrating a process implemented by the virtual machine life cycle management system in connection with restoring an archived virtual machine.

At step 325, the VM life cycle management system 200 restores the archived virtual machine, e.g., as described in greater detail herein with respect to FIG. 4. After step 325 the process 300 concludes.

Although described herein as shutting down idle virtual machines, the system and methods described herein may similarly detect physical machines that have been idle for a predefined period of time and shut down or power off the idle physical machines, or otherwise reduce their functionality. By shutting down idle machines, either virtual or physical, the VM life cycle management system may assist in meeting "green energy" certifications, standards, or other benchmarks, such as being a Green Energy Compliant System.

Illustrative Restore Process

FIG. 4 is a flow diagram illustrating a process 400 implemented by the VM life cycle management system 200 in connection with restoring an archived virtual machine 110. The process 400 begins at step 402, where the VM life cycle management system 200 provides an indication that the virtual machine 110 has been archived. The VM life cycle management system 200 may e.g., indicate that the virtual machine 110 has been archived by displaying the virtual machine 110 with an icon that is different from the icon that is displayed with a virtual machine 110 that has not been archived. At step 405, the VM life cycle management system 200 detects a selection of the archived virtual machine 110. At step 410, the VM life cycle management system provides an option to restore the archived virtual machine 110. For example, upon detecting a right-click of the icon associated with the archived virtual machine 110, the VM life cycle management system 200 may display a right-click option of "recover and restart" for the archived virtual machine 110. At step 415, the VM life cycle management system detects a selection of the option to restore the virtual machine file.

At step 420, the VM life cycle management system 200 restores the archived virtual machine file by copying the archived virtual machine file from the storage device 116 to the virtual machine host 105. As virtual machine files may be quite large, the recovery process may be somewhat lengthy. During the recovery process, the VM life cycle management system 200 may display an indication of the status of the recovery process. The VM life cycle management system 200 may also perform other operations upon the virtual machine file, such as decompressing the virtual machine file, decrypting the virtual machine file, and/or replacing data objects that had been removed from the virtual machine file by, e.g., deduplication or single-instancing processes. After the VM life cycle management system 200 has recovered the virtual machine file, at step 425 the VM life cycle management system 200 provides a notification that the archived virtual machine 110 has been restored to the virtual machine host 105. For example, the VM life cycle management system 200 may send an electronic message to the user that requested that the virtual machine 110 be recovered. The electronic message notifies the user of the recovery of the virtual machine 110. At step 430, the VM life cycle management system starts the recovered virtual machine 110. The VM life cycle management system 200 may start the virtual machine 110 in the state it was in when it was archived.

The VM life cycle management system 200 may also perform other actions once the virtual machine 110 has been recovered. For example, the VM life cycle management system 200 may cause services running on the virtual machine 110 to start, the VM life cycle management system may cause an operation to be performed by the virtual machine 110, such as running a batch job, or perform other actions. As another example, the VM life cycle management system 200 may have a standard set of operations that the virtual machine 110 is to perform upon being recovered. The VM life cycle management system 200 may provide the standard set of instructions to the virtual machine 110, so that the virtual machine 110 can perform the instructions upon restarting. Those of ordinary skill in the art will understand that the virtual machine 110, upon being recovered, can perform various actions or operations, and is not limited to the examples given herein. After step 430, the process 400 concludes.

One advantage of the techniques described herein is that the VM life cycle management system 200 can detect idleness of virtual machines 110 across different types of heterogeneous virtual machine environments. For example, the VM life cycle management system 200 may be able to detect idleness of VMware virtual machines, Microsoft hyper-v virtual machines, Amazon Cloud virtual machines, and other types of virtual machines. Accordingly, the detection of idle virtual machines 110 can work across disparate vendors and across heterogeneous operating systems.

Another advantage is that such techniques both facilitate the freeing up of limited resources of virtual machine hosts 105 and provide the capability of easily recovering archived virtual machines 110. Accordingly, a user can both quickly and easily delete virtual machines 110 that may no longer be necessary or required, while retaining the option of recovering the deleted virtual machines 110. Such option may be quite useful, if in the future it is determined that the archived virtual machines 110 are necessary or required.

Although the techniques described herein have been described in the context of detecting and archiving idle virtual machines 110, the techniques may also be used to detect and archive virtual machines 110 for other purposes or virtual machines 110 that are not idle. For example, virtual machines 110 may be leased by or associated with customers on a per virtual machine basis. If the customer discontinues the lease or stops paying for the virtual machine 110, the techniques described herein may be used to detect such refusal to pay, and then shut down and archive the virtual machine 110. For example, the VM life cycle management system 200 could access a billing server, process a job to determine which virtual machines are associated with unpaid bills, and then shut down and archive such virtual machines 110. Upon receiving payment for the virtual machine 110, the VM life cycle management system 200 can recover the virtual machine file associated with the virtual machine 110, such that the user can continue once again to utilize the virtual machine 110.

As another example, the techniques described herein may be used to detect virtual machine hosts 105 that are over-utilized. The VM life cycle management system 200 can detect such over-utilized virtual machine hosts 105, and then shut down and archive the least important or the lowest-priority virtual machines 110. Additionally or alternatively, instead of archiving the virtual machine file to the storage device 116, the VM life cycle management system 200 may instead move the virtual machine file and other associated files to another virtual machine host 105 that the VM life cycle management system 200 has determined is capable of hosting the virtual machine 110.

Managing Virtual Machines Based on Historical Trends

The VM life cycle management system 200 may manage virtual machines based on historical trends. For example, the system 200 may use historical data to determine that a virtual machine host 105 has had a peak load on the virtual machine 110 and may reconfigure the virtual machine host 105 to give the virtual machine 110 more resources at this peak load time. Additionally or alternatively, the system 200 may dynamically move virtual machines 110 from an over-utilized virtual machine host 105 to another virtual machine host 105. The system 200 may do this in real-time based on historical trends and in such a fashion that it is transparent to end users of the virtual machine 110.

As another example, the VM life cycle management system 200 may perform virtual machine management by correlating trending information or historical reports and information obtained from and/or during data storage operations, as well as forecast data for future operations and performance. The system 200 may employ flexible virtual machine management policies and may monitor the operation, utilization, and storage of virtual machine data for a given period to modify or redistribute virtual machines 110 based on results obtained during the monitoring period or determined in forecasts. The system 200 may modify virtual machine configurations during the monitoring period, or may use any obtained information to modify virtual machine configurations.

Suitable Data Storage System

Figure 5A:
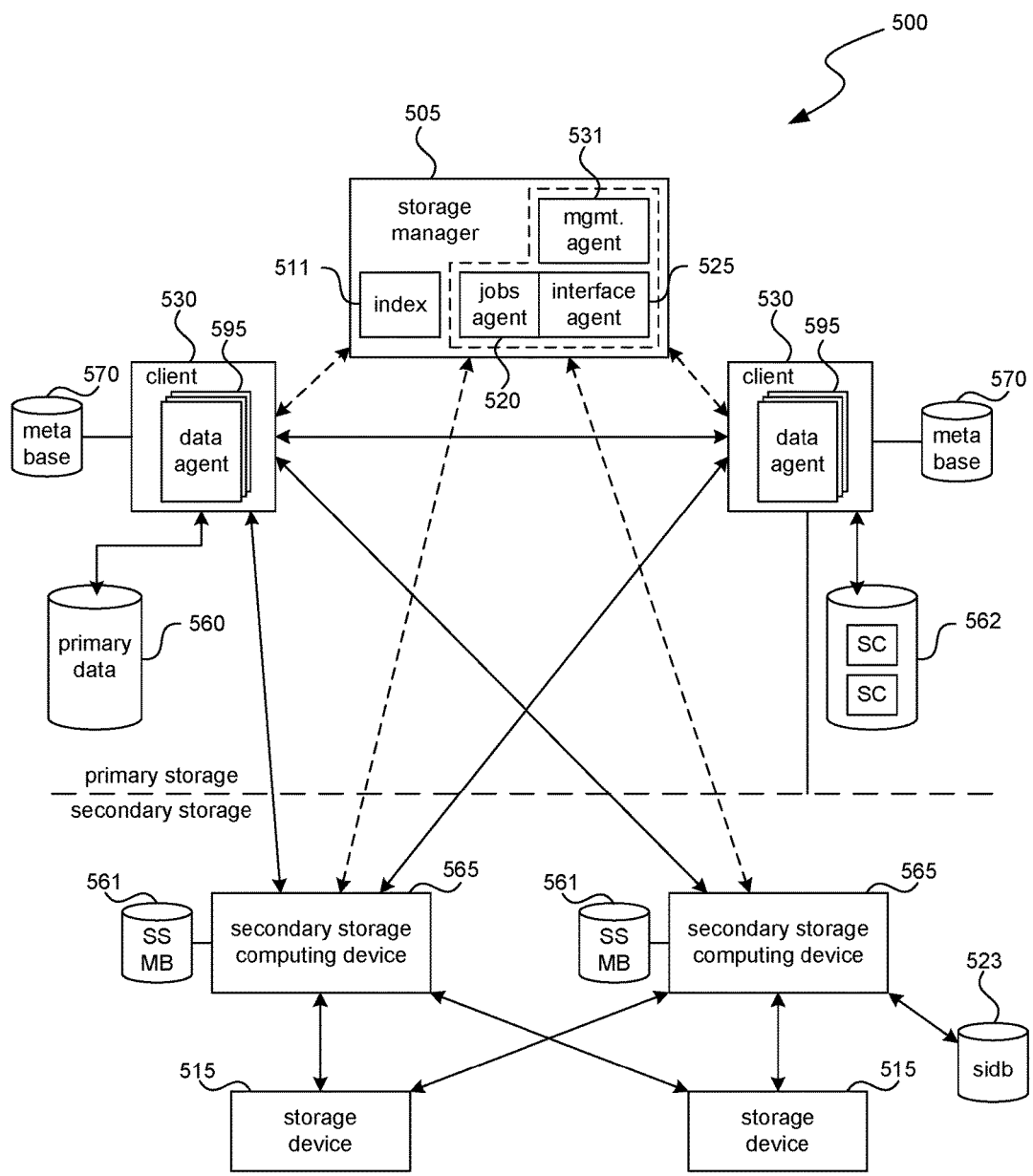
FIG. 5A is a block diagram illustrating a data storage system in which aspects of the technology may be performed.

FIG. 5A illustrates an example of one arrangement of resources in a computing network, comprising a data storage system 500. The resources in the data storage system 500 may employ the processes and techniques described herein. The system 500 includes a storage manager 505, one or more data agents 595, one or more secondary storage computing devices 565, one or more storage devices 515, one or more computing devices 530 (called clients 530), one or more data or information stores 560 and 562, a single instancing database 523, an index 511, a jobs agent 520, an interface agent 525, and a management agent 531. The system 500 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 500 may also represent a modular storage system such as the CommVault Simpana system, also available from CommVault Systems, Inc.

The system 500 may generally include combinations of hardware and software components associated with performing storage operations on electronic data. Storage operations include copying, backing up, creating, storing, retrieving, and/or migrating primary storage data (e.g., data stores 560 and/or 562) and secondary storage data (which may include, for example, snapshot copies, backup copies, hierarchical storage management (HSM) copies, archive copies, and other types of copies of electronic data stored on storage devices 515). The system 500 may provide one or more integrated management consoles for users or system processes to interface with in order to perform certain storage operations on electronic data as further described herein. Such integrated management consoles may be displayed at a central control system or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 515, retained for a specified period of time before being aged to another tier of secondary storage, copied to the storage device 515 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) A "retention policy" may specify how long data is to be retained at specific tiers of storage or what criteria must be met before data may be pruned or moved from one tier of storage to another tier of storage. Storage policies, schedule policies and/or retention policies may be stored in a database of the storage manager 505, to archive media as metadata for use in restore operations or other storage operations, or to other locations or components of the system 500.

The system 500 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 505 (or management agent 531), a secondary storage computing device 565, a client 530, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 565, client 530, or other network device connected to a primary storage volume, while a storage operation cell configured to perform HSM tasks may instead include a secondary storage computing device 565, client 530, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 505 that coordinates storage operations via the same secondary storage computing devices 565 and storage devices 515. This "overlapping" configuration allows storage resources to be accessed by more than one storage manager 505, such that multiple paths exist to each storage device 515 facilitating failover, load balancing, and promoting robust data access via alternative routes.

Alternatively or additionally, the same storage manager 505 may control two or more storage operation cells (whether or not each storage operation cell has its own dedicated storage manager 505). Moreover, in certain embodiments, the extent or type of overlap may be user-defined (through a control console) or may be automatically configured to optimize data storage and/or retrieval.

Data agent 595 may be a software module or part of a software module that is generally responsible for performing storage operations on the data of the client 530 stored in data store 560/562 or other memory location. Each client 530 may have at least one data agent 595 and the system 500 can support multiple clients 530. Data agent 595 may be distributed between client 530 and storage manager 505 (and any other intermediate components), or it may be deployed from a remote location or its functions approximated by a remote process that performs some or all of the functions of data agent 595.

The overall system 500 may employ multiple data agents 595, each of which may perform storage operations on data associated with a different application. For example, different individual data agents 595 may be designed to handle Microsoft Exchange data, Lotus Notes data, Microsoft Windows 2000 file system data, Microsoft Active Directory Objects data, and other types of data known in the art. Other embodiments may employ one or more generic data agents 595 that can handle and process multiple data types rather than using the specialized data agents described above.

If a client 530 has two or more types of data, one data agent 595 may be required for each data type to perform storage operations on the data of the client 530. For example, to back up, migrate, and restore all the data on a Microsoft Exchange 2000 server, the client 530 may use one Microsoft Exchange 2000 Mailbox data agent 595 to back up the Exchange 2000 mailboxes, one Microsoft Exchange 2000 Database data agent 595 to back up the Exchange 2000 databases, one Microsoft Exchange 2000 Public Folder data agent 595 to back up the Exchange 2000 Public Folders, and one Microsoft Windows 2000 File System data agent 595 to back up the file system of the client 530. These data agents 595 would be treated as four separate data agents 595 by the system even though they reside on the same client 530.

Alternatively, the overall system 500 may use one or more generic data agents 595, each of which may be capable of handling two or more data types. For example, one generic data agent 595 may be used to back up, migrate and restore Microsoft Exchange 2000 Mailbox data and Microsoft Exchange 2000 Database data while another generic data agent 595 may handle Microsoft Exchange 2000 Public Folder data and Microsoft Windows 2000 File System data, etc.

Data agents 595 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 505 or secondary storage computing devices 565. As used herein, a file or a data object refers to any collection or grouping of bytes of data that can be viewed as one or more logical units.

Generally speaking, storage manager 505 may be a software module or other application that coordinates and controls storage operations performed by the system 500. Storage manager 505 may communicate with some or all elements of the system 500, including clients 530, data agents 595, secondary storage computing devices 565, and storage devices 515, to initiate and manage storage operations (e.g., backups, migrations, data recovery operations, etc.).

Storage manager 505 may include a jobs agent 520 that monitors the status of some or all storage operations previously performed, currently being performed, or scheduled to be performed by the system 500. (One or more storage operations are alternatively referred to herein as a "job" or "jobs.") Jobs agent 520 may be communicatively coupled to an interface agent 525 (e.g., a software module or application). Interface agent 525 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 525, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 515).

Storage manager 505 may also include a management agent 531 that is typically implemented as a software module or application program. In general, management agent 531 provides an interface that allows various management agents 531 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 525. This allows each storage operation cell to send and receive certain pertinent information from other storage operation cells, including status information, routing information, information regarding capacity and utilization, etc. These communications paths may also be used to convey information and instructions regarding storage operations.

For example, a management agent 531 in a first storage operation cell may communicate with a management agent 531 in a second storage operation cell regarding the status of storage operations in the second storage operation cell. Another illustrative example includes the case where a management agent 531 in a first storage operation cell communicates with a management agent 531 in a second storage operation cell to control storage manager 505 (and other components) of the second storage operation cell via management agent 531 contained in storage manager 505.

Another illustrative example is the case where management agent 531 in a first storage operation cell communicates directly with and controls the components in a second storage operation cell and bypasses the storage manager 505 in the second storage operation cell. If desired, storage operation cells can also be organized hierarchically such that hierarchically superior cells control or pass information to hierarchically subordinate cells or vice versa.

Storage manager 505 may also maintain an index, a database, or other data structure 511. The data stored in database 511 may be used to indicate logical associations between components of the system, user preferences, management tasks, media containerization and data storage information or other useful data. For example, the storage manager 505 may use data from database 511 to track logical associations between secondary storage computing device 565 and storage devices 515 (or movement of data as containerized from primary to secondary storage).

Generally speaking, the secondary storage computing device 565, which may also be referred to as a media agent, may be implemented as a software module that conveys data, as directed by storage manager 505, between a client 530 and one or more storage devices 515 such as a tape library, a magnetic media storage device, an optical media storage device, or any other suitable storage device. In one embodiment, secondary storage computing device 565 may be communicatively coupled to and control a storage device 515. A secondary storage computing device 565 may be considered to be associated with a particular storage device 515 if that secondary storage computing device 565 is capable of routing and storing data to that particular storage device 515.

In operation, a secondary storage computing device 565 associated with a particular storage device 515 may instruct the storage device to use a robotic arm or other retrieval means to load or eject a certain storage media, and to subsequently archive, migrate, or restore data to or from that media. Secondary storage computing device 565 may communicate with a storage device 515 via a suitable communications path such as a SCSI or Fibre Channel communications link. In some embodiments, the storage device 515 may be communicatively coupled to the storage manager 505 via a SAN.

Each secondary storage computing device 565 may maintain an index, a database, or other data structure 561 that may store index data generated during storage operations for secondary storage (SS) as described herein, including creating a metabase (MB). For example, performing storage operations on Microsoft Exchange data may generate index data. Such index data provides a secondary storage computing device 565 or other external device with a fast and efficient mechanism for locating data stored or backed up. Thus, a secondary storage computing device index 561, or a database 511 of a storage manager 505, may store data associating a client 530 with a particular secondary storage computing device 565 or storage device 515, for example, as specified in a storage policy, while a database or other data structure in secondary storage computing device 565 may indicate where specifically the data of the client 530 is stored in storage device 515, what specific files were stored, and other information associated with storage of the data of the client 530. In some embodiments, such index data may be stored along with the data backed up in a storage device 515, with an additional copy of the index data written to index cache in a secondary storage device. Thus the data is readily available for use in storage operations and other activities without having to be first retrieved from the storage device 515.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 515. In some embodiments, the cached information may include information regarding format or containerization of archives or other files stored on storage device 515.

One or more of the secondary storage computing devices 565 may also maintain one or more single instance databases 523. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS; 2) U.S. patent application Ser. No. 12/145,347 (entitled APPLICATION-AWARE AND REMOTE SINGLE INSTANCE DATA MANAGEMENT; or 3) U.S. patent application Ser. No. 12/145,342 (entitled APPLICATION-AWARE AND REMOTE SINGLE INSTANCE DATA MANAGEMENT, 4) U.S. patent application Ser. No. 11/963,623 (entitled SYSTEM AND METHOD FOR STORING REDUNDANT INFORMATION; 5) U.S. patent application Ser. No. 11/950,376 (entitled SYSTEMS AND METHODS FOR CREATING COPIES OF DATA SUCH AS ARCHIVE COPIES; or 6) U.S. Pat App. No. 61/100,686 (entitled SYSTEMS AND METHODS FOR MANAGING SINGLE INSTANCING DATA, each of which is incorporated by reference herein in its entirety.

In some examples, the secondary storage computing devices 565 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. Pat. App. No. 61/164,803 (entitled STORING A VARIABLE NUMBER OF INSTANCES OF DATA OBJECTS.

In some embodiments, certain components may reside and execute on the same computer. For example, in some embodiments, a client 530 such as a data agent 595, or a storage manager 505, coordinates and directs local archiving, migration, and retrieval application functions as further described in the previously-referenced U.S. patent application Ser. No. 09/610,738. This client 530 can function independently or together with other similar clients 530.

As shown in FIG. 5A, secondary storage computing devices 565 each has its own associated metabase 561. Each client 530 may also have its own associated metabase 570. However in some embodiments, each "tier" of storage, such as primary storage, secondary storage, tertiary storage, etc., may have multiple metabases or a centralized metabase, as described herein. For example, rather than a separate metabase or index associated with each client 530 in FIG. 5A, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 505 or other management module may keep track of certain information that allows the storage manager 505 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 530, and can contain either all of the data of the clients 530 or a designated subset thereof. As depicted in FIG. 5A, the data store 562 includes two sub-clients. For example, an administrator (or other user with the appropriate permissions; the term administrator is used herein for brevity) may find it preferable to separate email data from financial data using two different sub-clients having different storage preferences, retention criteria, etc.

Distribution of Data Management Functionality in a Suitable Data Storage System

Figure 5B:
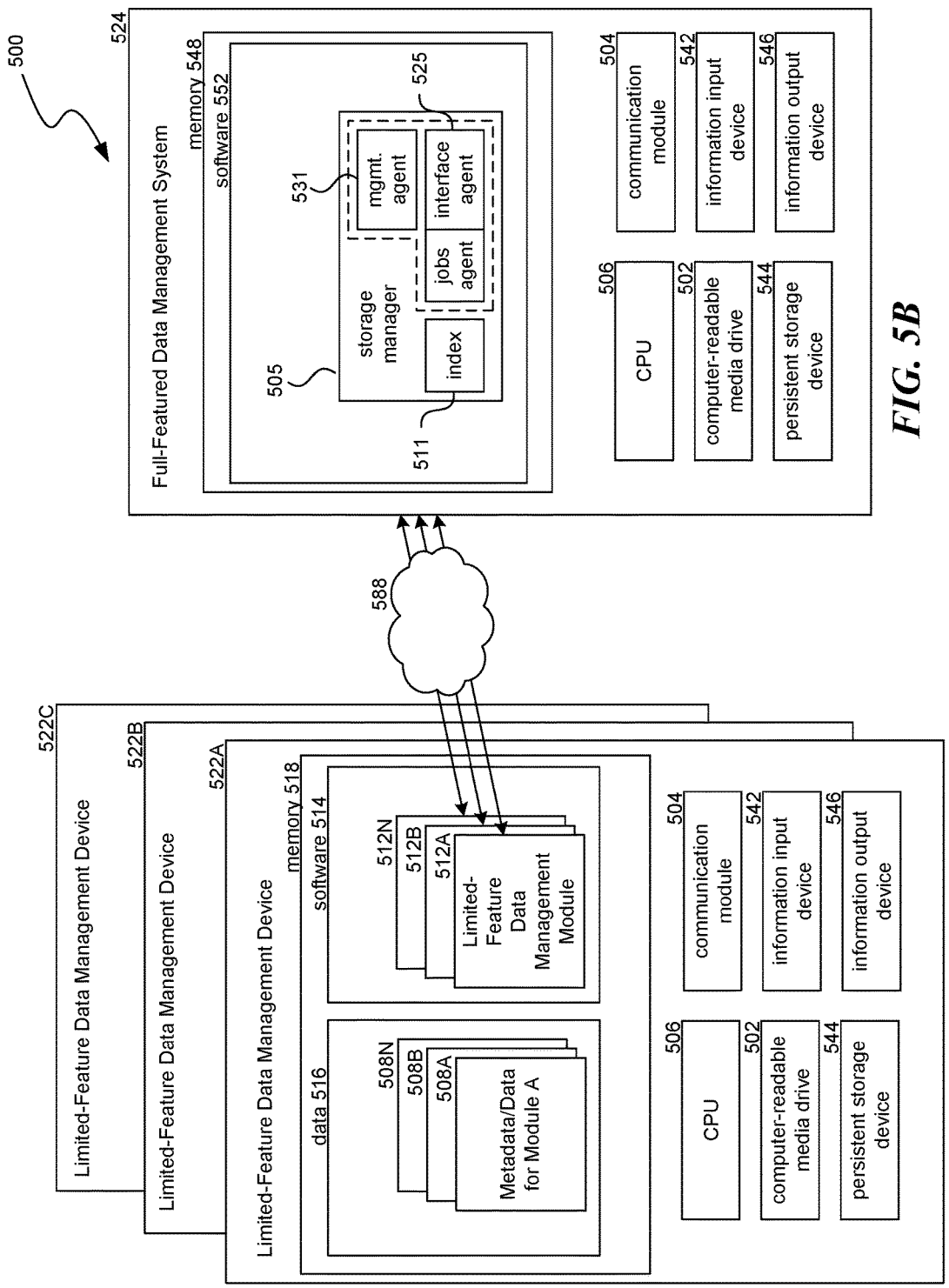
FIG. 5B is a block diagram illustrating a data storage system in which aspects of the technology may be performed.

Various discrete data management functionalities provided by the data storage system 500, including virtual machine management, may be distributed or divided so the functionalities are implemented across software modules on various devices capable of docking with a full-featured data management system. FIG. 5B illustrates an environment 550 in which discrete data management functionalities provided by the data storage system 500 are distributed between software modules on various devices capable of docking with a full-featured data management system. As shown, the environment 550 includes one or more limited-feature data management devices 522, each coupled via one or more networks 588 to a full-featured data management system 524.

Each of the limited-feature devices 522 includes a memory 518 having software 514 that in turn includes one or more limited-feature data management modules 512. Each limited-feature module 512 is capable of providing a particular, but limited, set of data management features alone, without the assistance or intervention of other modules or the full-featured system 524. However, each limited-feature module 512 may also be capable of providing, in whole or in part, additional synergistic features, outside of its limited set of data management features, but only after it has been docked to the full-featured 524, as described in greater detail herein.

Examples of limited-feature modules 512 include:

(1) A limited-feature virtual machine life cycle management module configured to provide the standalone ability to shut down virtual machines, which may include the virtual machine creation component 215, idleness determination component 230 and API 256 described above.

(2) A limited-feature private search module configured to provide the standalone ability to provide search results for a selected, restricted set of Internet sites.

(3) A limited-feature backup module configured to back up the data of client computers, but in a limited manner that is (a) constrained by the number of client computers or subclients that are backed up, (b) constrained by the volume of data that is backed up, or (c) otherwise constrained in the volume or quantity of data that is backed up.

(4) Data agents 595, as described herein.

(5) Secondary storage computing devices 565, as described herein.

(6) A limited-feature content store module that is configured to provide the standalone ability to create content stores in primary storage, as described further herein, but is unable to create content stores in secondary storage. Additional functionality that may be provided by limited-feature modules, and details on such functionality, may be found in the commonly-assigned patent application Ser. No. 12/751,804, entitled PERFORMING DATA STORAGE OPERATIONS WITH A CLOUD ENVIRONMENT, INCLUDING CONTAINERIZED DEDUPLICATION, DATA PRUNING, AND DATA TRANSFER, filed Mar. 31, 2010, now U.S. Patent Publication No. 2010/0332454.

The memory 518 of each limited-feature device 522 also comprises data 516, which in turn includes one or more sets of metadata or data 508 generated by, used by, or otherwise associated with a particular limited-feature module 512. For example, the set of metadata or data 508A may include secondary copies of data or metadata generated by storage operations performed by module 512A and/or configuration settings, including storage policies and other policies, used by module 512A. A single limited-feature device 522 may have any combination of one or more limited-feature modules 512 installed on it.

The limited-feature device 522 can be implemented by or in any of the components illustrated in FIGS. 1 and 5A, such as by or in the virtual machine hosts 105, the virtual machine manager 150, the virtual machine proxy 145, the secondary storage computing device 165/565, the client 530, or the storage manager 505. The functionality of the limited-feature device 522 may be performed by any or all of such components.

The full-featured system 524 is configured to provide or facilitate numerous additional data management features, namely features that are not provided by any of the limited-feature modules 512 alone. For example, the full-featured system 524 may provide features such as those described in the commonly-assigned patent applications incorporated by reference herein, including: policy-driven data management; data replication and protection; cloud storage integration; storage resource management, analysis, optimization, and reporting; data archiving, deduplication, compression and encryption; electronic discovery (E-discovery), privacy, retention life cycle, and compliance management; backup and recovery; content indexing; data classification; enterprise and collaborative data mining and search; migration from legacy data storage solutions; virtual server protection; disaster recovery; access control and security. As shown, the memory 548 of the full-featured system 524 typically includes software 552, such a storage manager 505 and its constituent components described herein, and may also include global storage policies and other types of policies applicable to numerous limited-feature devices 522. One example of a full-featured system 524 is the Common Technology Engine of the Simpana system introduced above.

Each limited-feature device 522 and the full-featured system 524 also comprise a communication module 504 for connecting to networks 588 and for initiating and conducting communications with other devices on the networks. The communication module 504 also permits each limited-feature device 522 and the full-featured system 524 to perform authentication procedures. The communication module 504 is configured to conduct communications with other devices via the Windows Management Instrumentation (WMI) service, via another operating system interface, via a Secure Shell (SSH) or similar network connection, and/or by listening for and exchanging messages via a designated port (e.g., port 8400). In other words, the limited-feature device 522 and the full-featured system 524 employ a common protocol and known APIs to ensure seamless connectivity and interface between the two.

Each limited-feature device 522 and the full-featured system 524 further includes one or more central processing units (CPU) 506 for executing software, and a computer-readable media drive 502 for reading information or installing software from tangible computer-readable storage media, such as a floppy disk, a CD-ROM, a DVD, a USB flash drive, and/or other tangible computer-readable storage media. Each limited-feature device 522 and the full-featured system 524 may also include one or more of the following: an information input device 542 (for example, a mouse, a keyboard, microphone, remote control, etc.), and an information output device 546 (for example, a display, printer, speakers, etc.)

While various items are described as stored in memory, those skilled in the art will appreciate that these items, or portions of them, may be transferred between memory and a persistent storage device 544 (for example, a magnetic hard drive, a tape of a tape library, etc.) for purposes of memory management, data integrity, and/or other purposes.

Although only a single full-featured system 524 is shown, a single limited-feature device 522 may dock to two or more different full-featured systems 524.

Figure 7:
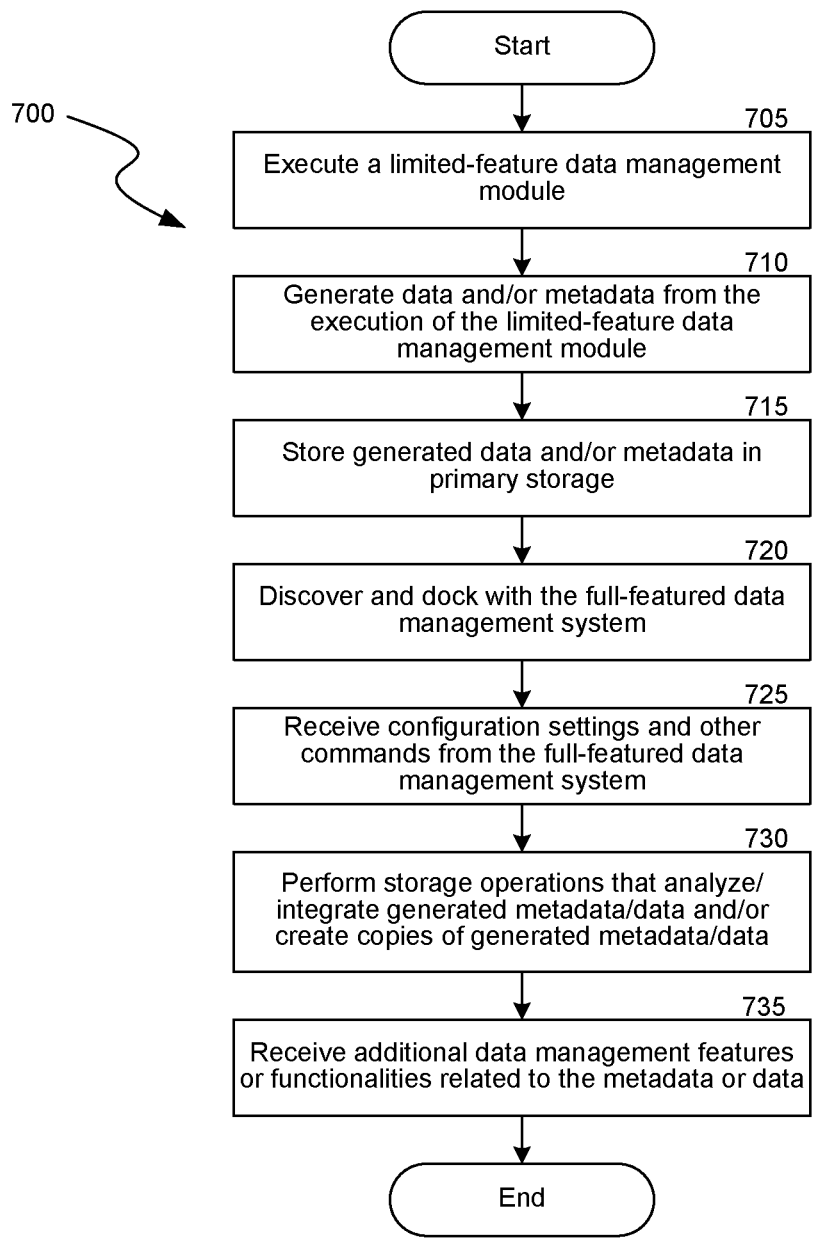
FIG. 7 is a flow diagram illustrating a general process for docking a limited-feature data management module on a limited-feature data management device to a full-featured data management system.

FIG. 7 shows a general process 700 for docking a limited-feature module 512 on a limited-feature device 522 to a full-featured system 524. The process 700 begins at block 705 when the limited-feature device 522 executes a limited-feature module 512 that has been installed. At block 710, without interaction with the full-featured system 524, the limited-feature device generates data and/or metadata from the execution of the limited-feature module 512. At block 715, the limited-feature module 512 stores generated data and/or metadata, typically in primary storage.

At block 720, the limited-feature module 512 discovers and docks with the full-featured system 524. The discovery and docking at block 720 may occur upon a user-provided or automated command to the limited-feature module 512 and/or full-featured system 524. As a first example, the limited-feature module 512 may display a graphical interface option (e.g., a button or menu option) that permits a user to indicate that he wants to dock the module to a full-featured system 524. After the user indicates that docking is desired, the limited-feature module 512 may detect (e.g., using its associated communication module 504) any full-featured systems present on the networks 588 (e.g., on a particular organization's network or another local area network). The module 512 may then present a list of these systems to the user, so that the user can indicate which full-featured system he wants to dock the module to. As a second example, the full-featured system 524 may display a graphical interface option (e.g., a button or menu option) that permits a user (such as an administrator) to indicate that he wants to dock one or more modules to the full-featured system. After the user indicates that docking is desired, the full-featured system 524 may detect (e.g., using its associated communication module 504) any limited-feature modules 512 present on the networks 588 (e.g., on a particular organization's network or another local area network). The full-featured system 524 may then present a list of these modules 512 to the user, so that the user can indicate which modules he wants docked to the full-featured system. Under either example, the interface may provide an option to provide subsequent, automatic docking when certain conditions are met, such as temporal conditions (docking daily, weekly, monthly), volume conditions (when amount of data in primary storage exceeds a certain storage limit (e.g. a percent of a maximum capacity, or a certain MB or GB limit), or other conditions.

The discovery and docking may occur, for example, by the limited-feature module 512 and/or the full-featured system 524 utilizing a Windows Management Instrumentation (WMI) service, another operating system interface, a Secure Shell (SSH) or similar network connection, or by exchanging messages via a designated port (e.g., port 8400). During the docking, either the limited-feature module 512, the full-featured system 524, and/or both may conduct various authentication procedures to verify that the docking is authorized by using any known authorization, such as standard username/password, access control logic (available in many operating systems), etc.

At block 725, the limited-feature module 512 receives configuration settings and other commands from the full-featured system 524. For example, the limited-feature module 512 may receive data storage policies, scheduling policies, other policies, or commands to perform specific data storage operations. At block 730, the full-featured system 524, either alone or in conjunction with the limited-feature module 512, performs storage operations different than those performed at block 705 that (1) analyze or integrate generated metadata and/or data, and/or (2) create copies of the generated metadata and/or data, typically secondary copies such as backup or archive copies stored in secondary storage.

As one example, at block 730, the full-featured system 524 may integrate the metadata and/or data generated at block 705 with existing metadata and data that are already under management by the full-featured system. As part of the integration of metadata and/or data, the full-featured system 524 may perform some normalization, association, or deduplication of the generated metadata and/or data. For example, if the full-featured system 524 manages the metadata and data from numerous different limited-feature modules 512, it may check for identical and therefore duplicative metadata or data received from the various modules. To identify identical metadata and data, the system may use hardware-based identifiers (e.g., NIC cards, MAC addresses), content-based identifiers (e.g., GUIDs, hashes, etc.), and/or a combination of these.

At block 735, a user of the limited-feature device 522 may receive additional data management features or functionalities related to the metadata or data, e.g., either synergistic features of the limited-feature module 512 that were the unlocked as a result of the docking and/or directly from the full-featured system 524. For example, the user may receive additional data management features or functionalities such as content indexing, data classification, compression, encryption, deduplication, or other features mentioned herein.

Distribution of Virtual Machine Management Functionality Via Docking

Figure 6:
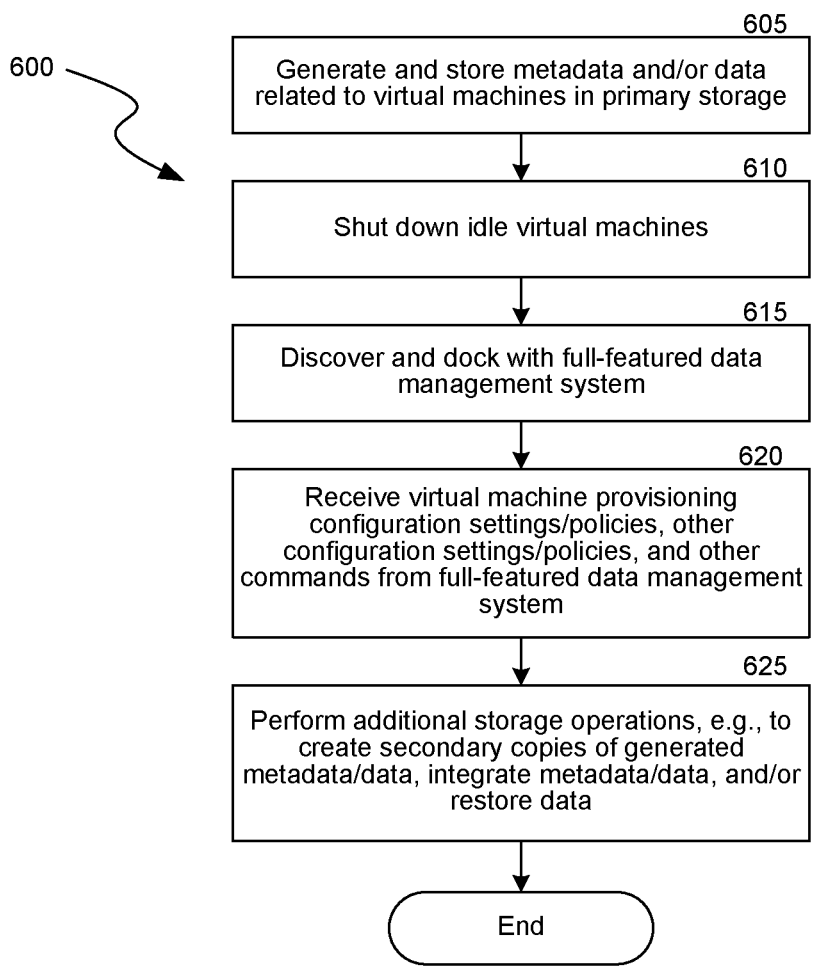
FIG. 6 is a flow diagram illustrating a process for docking a limited-feature virtual machine life cycle management module with a full-featured data management system.

Returning to the specific example of managing virtual machines, FIG. 6 shows a flow diagram illustrating a process 600 for docking a limited-feature virtual machine (VM) life cycle management module with a full-featured data management system 524. The process 600 begins at block 605, when a limited-feature VM life cycle management module generates and stores metadata and/or data related to virtual machines in primary storage, which may occur, for example, by the limited-feature VM life cycle management module performing blocks 301, 302, 303, 305 and/or 310 of process 300. Next at block 610, the limited-feature VM life cycle management module shuts down idle virtual machines, which may occur, for example, by the limited-feature VM life cycle management module performing block 315 of process 300. At block 615, the limited-feature VM life cycle management module discovers and docks with a full-featured system 524, as described above.

At block 620, the limited-feature VM life cycle management module receives virtual machine life cycle management configuration settings, other configuration settings or policies, and/or other commands from the full-featured system 524. For example, the VM life cycle management module may receive the archive or storage rules, criteria, and policies described previously that, among other things, determine if, when, and how virtual machines should be shut down, backed up, and/or archived.

At block 625, the limited-feature VM life cycle management module and/or full-featured system 524 performs storage operations that may, for example create secondary copies of the stored metadata or data, integrate the generated metadata or data, or restore metadata or data. At block 625, the limited-feature VM life cycle management module, in conjunction with the full-featured system 524 may backup and/or archive the virtual machine disk files, virtual hard disk image files, and/or similar virtual machine files, e.g., as described at block 320 of process 300. Also at block 625, the limited-feature VM life cycle management module may transmit the generated metadata in primary storage to the full-featured system 524 in order to integrate the generated metadata with metadata related to other virtual machines or other clients in other storage operation cells managed by the full-featured system 524. As yet another example, the limited-feature VM life cycle management module, in conjunction with the full-featured system 524, may restore an archived virtual machine, e.g., by performing process 400 of FIG. 4. Additionally, in conjunction with these storage operations, the full-featured system 524 may provide additional storage management features, such as deduplication, compression, content indexing, data classification, or other operations, e.g., upon backed up or archived virtual machine files.

Distribution of Private Search Functionality Via Docking

The data storage system 500 may also provide private search functionality whereby only a selected, restricted set of internet sites are searchable by users. Private search functionality provides a way for organizations, such as schools and libraries, to automatically restrict the scope of internet search results provided to their users, e.g., students and library patrons. As described in greater detail herein, such private search functionality may be divided between a limited-feature private search module and a full-featured system 524. Moreover, the data storage system 500 may provide different groups of selected sites to different groups of users, e.g., based upon access policies or other security measures.

Figure 8:
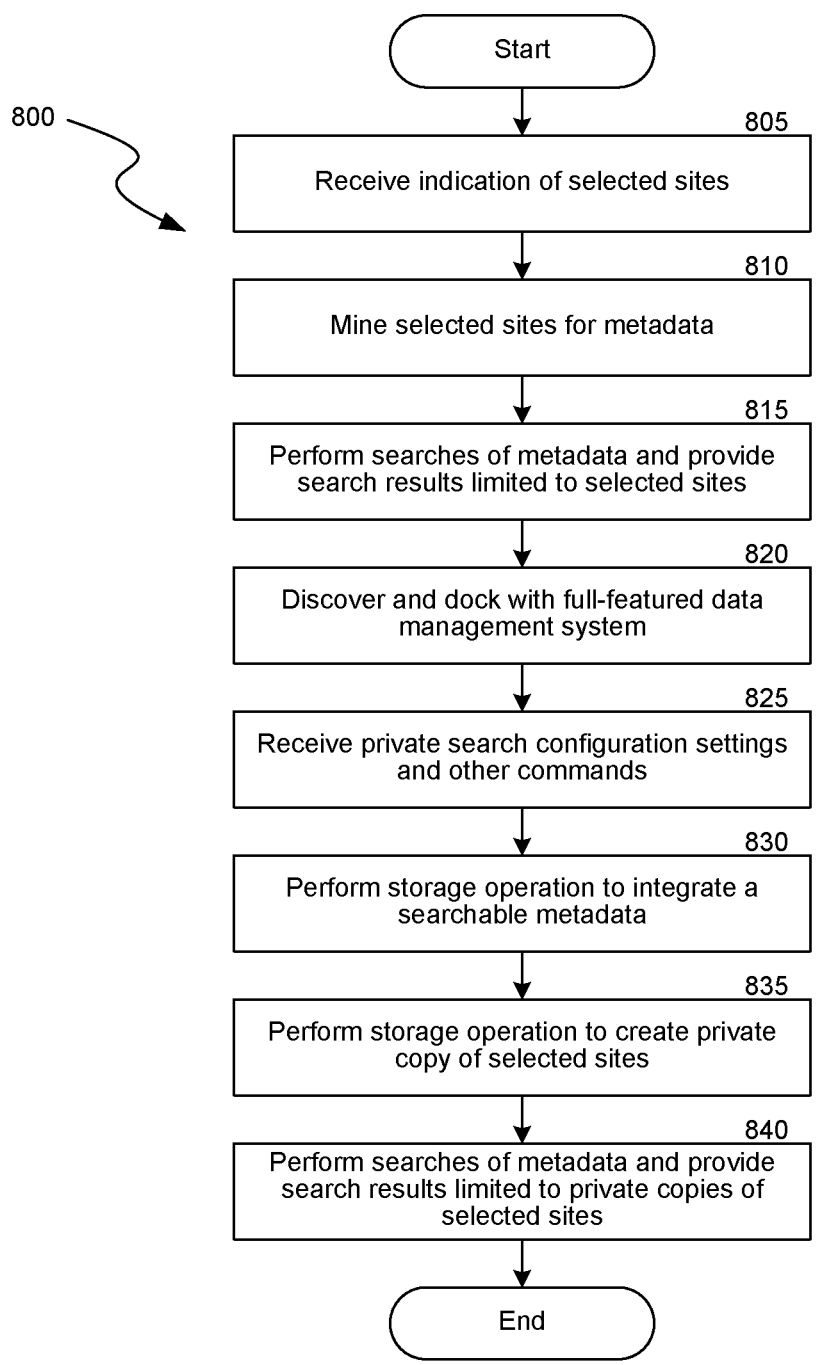
FIG. 8 is a flow diagram illustrating a process for providing private search functionality by docking a limited-feature private search module with a full-featured data management system.

FIG. 8 shows a process 800 for providing private search functionality by docking a limited-feature private search module with a full-featured system 524. The process 800 begins at block 805, when the limited-feature private search module receives an indication of selected internet sites or other data sources that should be searchable by users. At block 810, the limited-feature private search module connects to and mines the selected sites to generate metadata and compiles the metadata into a searchable database or index. At block 815, in response to receiving search queries from users, the limited-feature private search module performs searches of the searchable database or index and provides search results that direct users only to selected sites or sources that match the search criteria, but do not direct users to other unselected sites or sources that match the search criteria.

At block 820, the limited-feature private search module discovers and docks with a full-featured data management system 524, as described herein. At block 825, the limited-feature private search module receives private search configuration settings and other commands from the full-featured data management system 524. For example, the private search module may receive additional search policies that define different groups of users and define which selected sites each group of users may access. As another example, the private search module may receive storage policies that dictate if, when, and how selected internet sites or sources should be copied to a local cache, review set, or content store.

At block 830, the limited-feature private search module and/or full-featured data management system 524 performs a storage operation to integrate the searchable metadata with other metadata managed by the full-featured data storage system. At block 835, the limited-feature private search module, in conjunction with the full-featured system 524, performs storage operations to create a private, cached copy of one or more selected sites, e.g., in private primary or secondary storage within the data storage system 500, e.g., in a review set, content store, legal hold archive or other legal hold repository. In some examples, these storage operations are performed at the request of a user who is browsing search results provided by the private search module. At block 840, upon receiving a search query from a user after docking, the limited-feature private search module performs searches of the searchable database and returns search results that direct users only to private, cached copies of selected sites that match the search criteria. At block 840, after docking, the limited-feature private search module does not direct users to other unselected sites that match the search criteria or to the original locations of the selected sites that are available on the Internet.

Distribution of Backup Operations Via Docking

As described in greater detail herein, the data storage system 500 may also permit piecemeal backup protection, whereby different limited-feature backup modules are deployed throughout an organization, each of which is responsible for backing up a different group of clients. At a later time, the various modules may be docked to a full-featured system 524, so that the data and metadata generated from these different, piecemeal backup modules can be integrated at a global repository cell. Also, after docking, the various limited-feature backup modules may receive global settings, policies, and commands from the full-featured system in a top-down manner.

Figure 9:
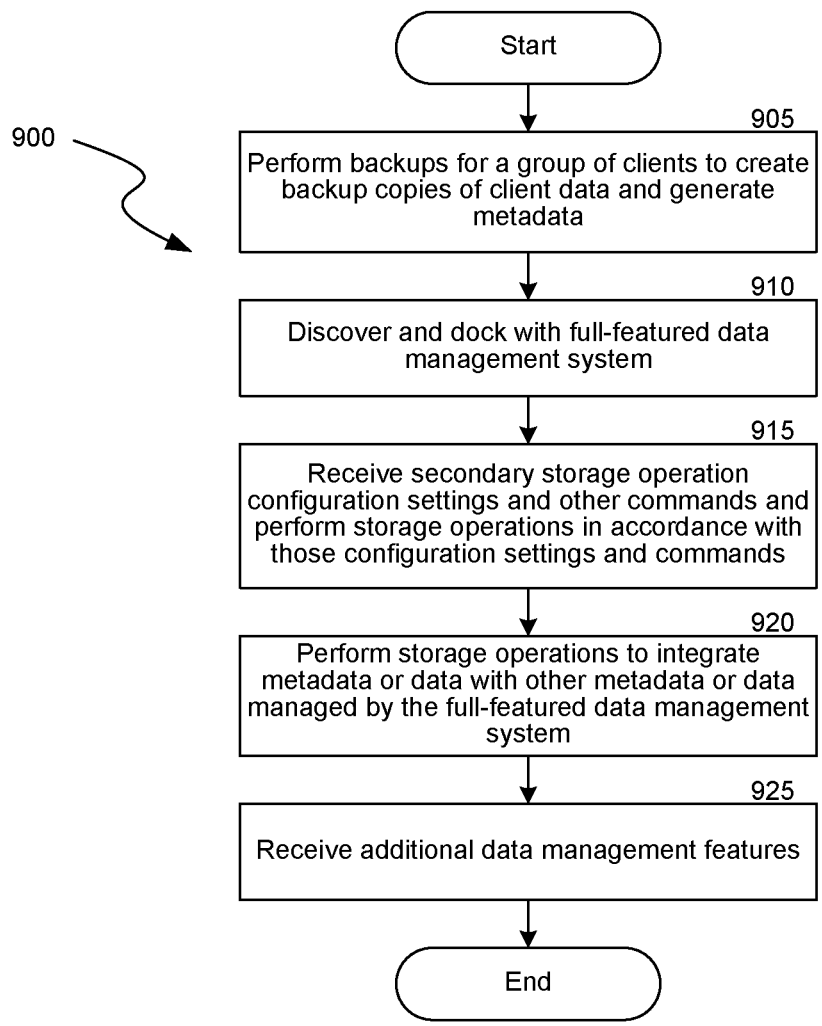
FIG. 9 is a flow diagram illustrating a process for docking a limited-feature backup module.

FIG. 9 shows a process 900 for docking a limited-feature backup module. The process 900 begins at block 905, when a limited-feature backup module backs up the primary data of a group of clients to create backup copies of the primary data and generate related metadata. For example, the limited-feature backup module may be configured such that it is capable of backing up the primary data of a group of one hundred or fewer client computers, but cannot back up more than one hundred client computers.

At block 910, the limited-feature backup module discovers and docks with a full-featured system 524, as described herein. At block 915, the limited-feature backup module receives secondary storage operation configuration settings and other commands from the full-featured system 524 and performs storage operations in accordance with those configuration settings and commands. For example, the limited-feature backup module may receive storage policies or scheduling policies from the full-featured system 524 and may subsequently perform data backup operations or other secondary storage operations in accordance with such policies. At block 920, the limited-feature backup module performs storage operations to integrate the generated metadata or backup copy data with other metadata or data managed by the full-featured system 524. For example, the limited-feature backup module may copy metadata to the system in order to integrate it with other metadata generated by another limited-feature backup module that is responsible for backing up a different group of clients. At block 925, the limited-feature backup module or its users receive additional storage management features or functionalities from the full-featured system, such as content indexing, data classification, deduplication, compression, encryption, or archiving of the generated backup copies or metadata.

Although the process 900 of FIG. 9 focuses on backup operations, it will be appreciated that instead, the process could feature other types of data management, suh as other secondary storage operations that create other types of secondary copies of client data and metadata, including snapshot copies, hierarchical storage management (HSM) copies, and archive copies.

Receiving Hosted Data Management Functionality Via Docking

Figure 10:
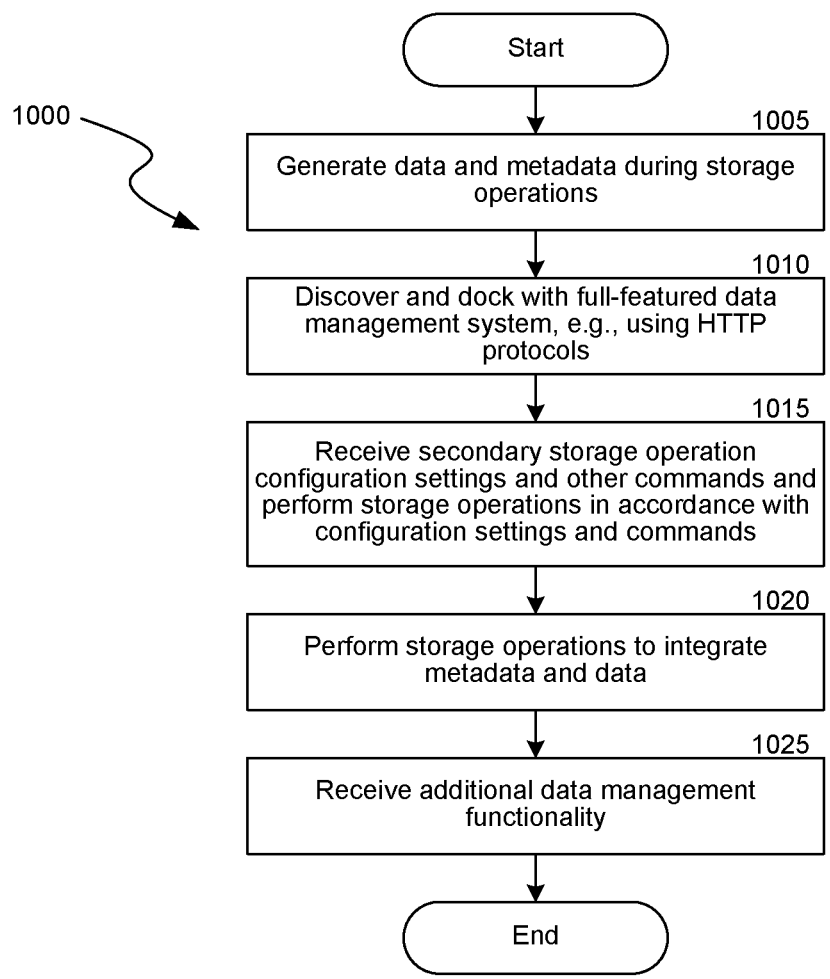
FIG. 10 is a flow diagram illustrating a process for providing top-down data management by docking a secondary storage computing device and/or data agent(s) with a full-featured data storage system operating as a hosted software service.

In some examples, the system 500 may be implemented so that top-down data management, such as the management functionality of a storage manager 505, is provided as a cloud-based, hosted software service to which other limited-feature modules dock. Such an implementation may permit faster and simpler deployment of a data management solution. FIG. 10 shows a process 1000 for providing top-down data management by docking a secondary storage computing device 565 and/or data agent(s) 595 with a full-featured data storage system 524 operating as a hosted software service. In some examples, the full-featured data storage system is the Common Technology Engine of the Simpana system described above, which is provided as a hosted software service and is accessible via HTTP protocols.

The process 1000 begins at block 1005, when one or more limited-feature modules 512, such as a secondary storage computing device 565 and/or data agent 595, generate data and metadata during storage operations, such as backup operations or archive operations. At block 1010, the limited-feature modules 512 discover and dock with a full-featured data storage system that is operating as a hosted cloud software service. The limited-feature storage operation modules may discover the full-featured data storage system by using HTTP protocols and the docking may utilize firewall techniques such as those described in commonly-assigned U.S. patent application Ser. No. 10/818,747, filed Apr. 4, 2004, entitled SYSTEM AND METHOD FOR PERFORMING STORAGE OPERATIONS THROUGH A FIREWALL, now U.S. Pat. No. 7,631,351, issued Dec. 8, 2009, and commonly-assigned U.S. patent application Ser. No. 12/643,653 , entitled MANAGING CONNECTIONS IN A DATA STORAGE SYSTEM, filed Dec. 21, 2009, now U.S. Patent Publication No. 2010/0242096, both of which are hereby incorporated herein in their entirety. At block 1015, the limited-feature modules 512 receive secondary storage operation configuration settings and other commands and perform storage operations in accordance with the configuration settings and commands. For example, the limited-feature modules may receive storage policies or scheduling policies and subsequently perform storage operations, such as backup or archive operations, in accordance with those policies. At block 1020, the limited-feature modules 512 perform storage operations to integrate previously-generated metadata and data with other metadata and data managed by the same data storage system 524. In some examples, for security reasons, no data flows up to the data storage system 524 for integration, but metadata may flow up to the data storage system so that it may be effectively integrated, managed and utilized by the data storage system. In still other examples, for security reasons, neither metadata nor data flows up to the data storage system 524 for integration, but the data storage system provides only configuration settings and commands. At block 1025, the limited-feature modules 512 or their users receive additional data management functionality, such content indexing, data classification, deduplication, compression, encryption, or archiving of the generated data and/or metadata.

Managing Content Stores Via Docking

Figure 11:
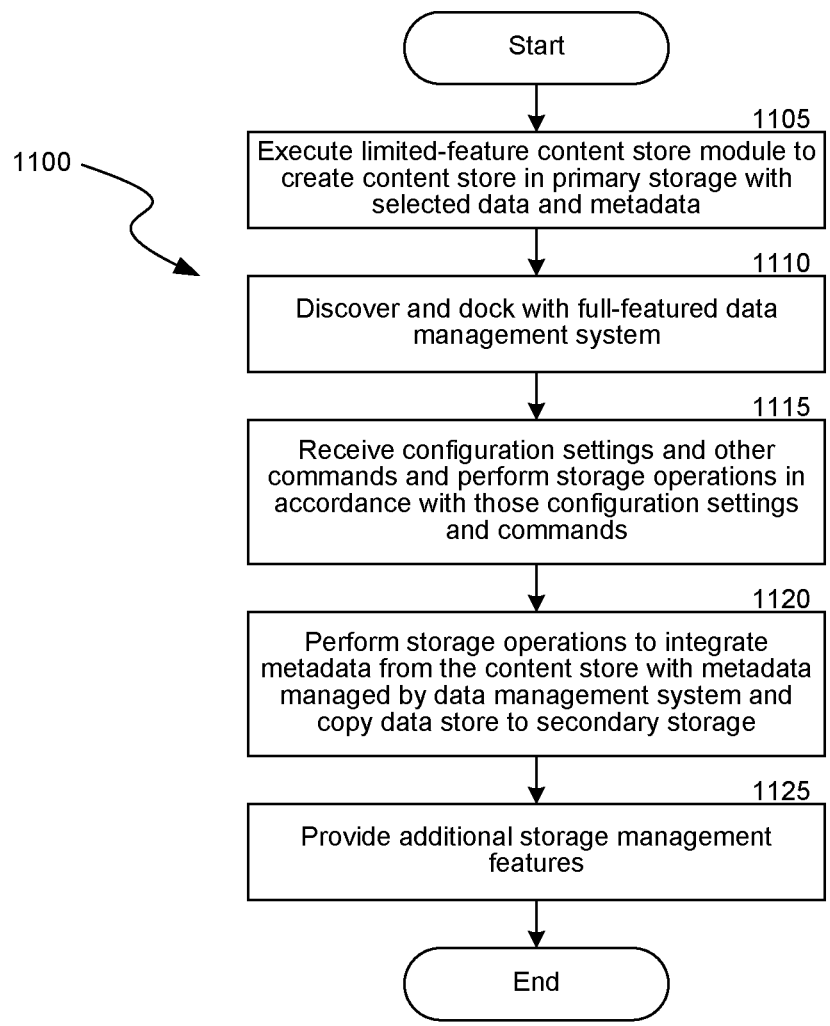
FIG. 11 is a flow diagram illustrating a process for receiving additional features related to a content store by docking a limited-feature content store module to a full-featured data management system.

In some examples, the system 500 permits users or applications to select data objects, such as files, and add a copy of those objects to a data repository, called a content store, as described in commonly-assigned patent application Ser. No. 12/876,916, entitled LEGAL COMPLIANCE, ELECTRONIC DISCOVERY AND ELECTRONIC DOCUMENT HANDLING OF ONLINE AND OFFLINE COPIES OF DATA, filed Sep. 7, 2010, now U.S. Patent Publication No. 2011/0093471 , which is hereby incorporated herein in its entirety. In some examples, the creation and management of a content store may be divided between a limited-feature module 512 and a full-featured system 524. FIG. 11 shows a process 1100 for receiving additional features related to a content store by docking a limited-feature content store module to a full-featured system 524. The process 1100 begins at block 1105, when a limited-feature device 522, such as a client 530, executes a limited-feature content store module in order to create, within primary storage, a content store having selected data and metadata. At block 1110, the limited-feature content store module discovers and docks with a full-featured system 524. At block 1115, the limited-feature content store module receives configuration settings and other commands from the full-featured system 524 and performs storage operations in accordance with the configuration settings and commands. At block 1120, the limited-feature content store module and/or full-featured system 524 perform storage operations to integrate the metadata and/or data from the content store with other metadata and/or data managed by the system 524. The limited-feature content store module and/or full-featured system may also perform storage operations, such as archive or backup operations, to create secondary copies of the content store, such as archive or backup copies, within secondary storage. At block 1125, the client or its users receive additional features from the full-featured system, such as deduplication, compression, encryption, content indexing, and data classification of the data and metadata within the content store.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

We claim:

1. A method for docking at least one limited-feature module, configured to be connected to a limited-feature device, with a full-featured data management system, wherein the limited-feature device is configured to be connectable to at least one computer via a network, the method comprising:
   executing, at the limited-feature device, a limited-feature module, wherein the limited-feature module has fewer features than the full-featured data management system;
   generating data based at least in part on the execution of the limited-feature module,
      wherein the data is generated without interaction with the full-featured data management system;
   storing the generated data at a storage device;
   discovering, by the limited-feature module, the fun-featured data management system;
   docking the limited-feature module with the full-featured data management system
      wherein by docking the limited-feature device to the full-featured device, metadata, profiles, configurations, or data from the limited-feature module are integrated and utilized;
   receiving, at the limited-feature module, at least one configuration setting from the tuft-featured data management system;
   performing, by the full-featured data management system, at least one storage operation,
      wherein the at least one storage operation includes analyzing the generated data, or integrating the generated data, or creating copies of the generated data, or any combination thereof; and
   receiving, at the limited-feature device, at least one data management feature based on the generated data.

2. The method of claim 1 wherein the limited-feature module is:
   a virtual machine life-cycle management module configured to manage at least one virtual machine,
   a private search module configured to provide search results for at least one Internet site,
   a backup module configured to back up data of at least one computer device, or
   a content store module configured to create at least one content store in a storage device.

3. The method of claim 1 wherein the full-featured data management system provides at least one feature,
   wherein the at least one feature includes:
      policy-driven data management,
      data replication and protection,
      cloud storage integration,
      storage resource management, analysis, optimization and reporting,
      data archiving, deduplication, compression and encryption,
      electronic discovery, privacy, retention life cycle and compliance management,
      backup and recovery,
      content indexing,
      data classification,
      enterprise and collaborative data mining and search,
      migration from legacy data storage solutions,
      virtual server protection,
      disaster recovery, or
      accessing control and security.

4. The method of claim 1 wherein discovering the full-feature data management system, further comprises:
   receiving, at a user interface, an indication from a user to dock the limited-feature module to a full-feature system;
   generating a list of fur-feature systems present on the network;
   displaying, at the user interface, the list of full-feature systems, wherein the list of full-feature systems includes the full-feature data management system; and
   receiving, at the user interface, a selection of at least one full-feature system from the list of full-feature system, wherein the selection of at least one full-feature system includes the full-feature data management system.

5. The method of claim 1 wherein the discovery of the full-featured data management system and the docking with the full-featured data management system occurs automatically.

6. The method of claim 1 wherein the at least one data management feature includes:
   content indexing,
   data classification,
   data compression,
   data encryption, or
   data deduplication.

7. The method of claim 1 further comprising:
   integrating the generated data with data stored at a storage device managed by the full-featured data management system,
   wherein the integration includes:
      normalization of the generated data,
      association of the generated data, or
      deduplication of the generated data.

8. The method of claim I further comprising:
   executing at least one authentication procedure to verify the docking is authorized.

9. A tangible computer-readable storage medium storing instructions, which when executed by at least one data processing device, performs a method for docking at least one limited-feature module, configured to be connected to a limited-feature device, with a full-featured data management system, wherein the limited-feature device is configured to be connectable to at least one computer via a network, the method comprising:
  executing, at the limited-feature device, a limited-feature module;
  generating data based at least in part on the execution of the limited-feature module,
    wherein the data is generated without interaction with the full-featured data management system;
  storing the generated data at a storage device;
  docking the limited-feature module with the full-featured data management system
    wherein by docking the limited-feature device to the full-featured device, metadata, profiles, configurations, or data from the limited-feature module are integrated and utilized;
  receiving, at the limited-feature module, at least one configuration setting from the full-featured data management system;
  performing, by the full-featured data management system, at least one storage operation,
    wherein the at least one storage operation includes analyzing the generated data, or integrating the generated data, or creating copies of the generated data, or any combination thereof; and
  receiving, at the limited-feature device, at least one data management feature based on the generated data.

10. The tangible computer-readable storage medium of claim 9 wherein the limited-feature module is:
  a virtual machine life-cycle management module configured to manage at least one virtual machine,
  a private search module configured to provide search results for at least one Internet site,
  a backup module configured to back up data of at least one computer device, or
  a content store module configured to create at least one content store in a storage device.

11. The tangible computer-readable storage medium of claim 9 wherein the full-featured data management system provides at least one feature,
  wherein the at least one feature includes:
    policy-driven data management,
    data replication and protection,
    cloud storage integration,
    storage resource management, analysis, optimization and reporting,
    data archiving deduplication, compression and encryption,
    electronic discovery, privacy, retention life cycle and compliance management,
    backup and recovery,
    content indexing,
    data classification,
    enterprise and collaborative data mining and search,
    migration from legacy data storage solutions,
    virtual server protection,
    disaster recovery, or
    accessing control and security.

12. The tangible computer-readable storage medium of claim 9, wherein the method further comprises:
  discovering, by the limited-feature module, the full-featured data management system.

13. The tangible computer-readable storage medium of claim 12 wherein discovering the full-feature data management system, further comprises:
  receiving, at a user interface, an indication from a user to dock the limited-feature module to a full-feature system;
  generating a list of full-feature systems present on the network;
  displaying, at the user interface, the list of full-feature systems, wherein the list of full-feature systems includes the full-feature data management system; and
  receiving, at the user interface, a selection of at least one full-feature system from the list of full-feature system, wherein the selection of at least one full-feature system includes the full-feature data management system.

14. The tangible computer-readable storage medium of claim 12 wherein the discovery of the full-featured data management system and the docking with the full-featured data management system occurs automatically.

15. The tangible computer-readable storage medium of claim 9
  wherein the at least one data management feature includes:
    content indexing,
    data classification,
    data compression,
    data encryption, or
    data deduplication.

16. The tangible computer-readable storage medium of claim 9 further comprising:
  integrating the generated data with data stored at a storage device managed by the full-featured data management system,
    wherein the integration includes:
      normalization of the generated data,
      association of the generated data, or
      deduplication of the generated data.

17. The tangible computer-readable storage medium of claim 9 further comprising:
  executing at least one authentication procedure to verify the docking is authorized.

18. An apparatus, coupled to a network and configured to perform data processing, the apparatus comprising:
  at least one hardware processor coupled to the network; and,
  at least one memory storing instructions, which when executed by the at least one processor, performs a method of:
    executing a limited-feature data management module, wherein the limited-feature data management module is configured to perform at least one data management operation;
    generating data or metadata based at least in part on the execution of the limited-feature data management module;
    storing generated data or metadata in the primary storage;
    interfacing with a full-featured data management system via the network,
      wherein by interfacing with the full-featured device, metadata, profiles, configurations, or data from the limited-feature module are integrated and utilized;
    receiving from the full-featured data management system, additional data management features or functionalities related to the metadata or data,
      wherein the additional data management features or functionalities include additional data management features or functionalities not available from the limited-feature data management module, and wherein the additional data management features or functionalities includes analyzing the generated data or metadata, or integrating the generated data or metadata, or creating copies of the generated data or metadata, or any combination thereof; and relinquishing the additional data management features or functionalities when disconnected from the network or undocked from the full- featured data management system.

19. The apparatus of claim 18 wherein the additional data management features or functionalities include:
content indexing,
data classification,
data compression,
data encryption, or
data deduplication.

20. The apparatus of claim 18 wherein the limited-feature module is:
a virtual machine life-cycle management module configured to manage at least one virtual machine,
a private search module configured to provide search results for at least one Internet site,
a backup module configured to back up data of at least one computer device, or
a content store module configured to create at least one content store in a storage device.

* * * * *